(12) United States Patent
Murakami

(10) Patent No.: US 12,304,003 B2
(45) Date of Patent: May 20, 2025

(54) PROCESSING PROGRAM CREATION DEVICE, METHOD FOR DETERMINING SCATTERING DIRECTION OF MOLTEN METAL, LASER PROCESSING MACHINE, AND LASER PROCESSING METHOD

(71) Applicant: AMADA CO., LTD., Kanagawa (JP)

(72) Inventor: Takuya Murakami, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 732 days.

(21) Appl. No.: 17/615,355

(22) PCT Filed: May 28, 2020

(86) PCT No.: PCT/JP2020/021040
§ 371 (c)(1),
(2) Date: Nov. 30, 2021

(87) PCT Pub. No.: WO2020/246354
PCT Pub. Date: Dec. 10, 2020

(65) Prior Publication Data
US 2022/0226933 A1 Jul. 21, 2022

(30) Foreign Application Priority Data
Jun. 5, 2019 (JP) .................. 2019-105098

(51) Int. Cl.
*B23K 26/38* (2014.01)
*B23K 26/04* (2014.01)
(Continued)

(52) U.S. Cl.
CPC .............. *B23K 26/38* (2013.01); *B23K 26/04* (2013.01); *B23K 26/0869* (2013.01);
(Continued)

(58) Field of Classification Search
None
See application file for complete search history.

(56) References Cited

U.S. PATENT DOCUMENTS

| 5,770,833 A | 6/1998 | Kanaoka |
| 2011/0108533 A1* | 5/2011 | Boettcher .......... B23K 26/1476 219/121.72 |

FOREIGN PATENT DOCUMENTS

| EP | 3766630 A1 | 1/2021 |
| JP | 9-206975 A | 8/1997 |

(Continued)

OTHER PUBLICATIONS

JP-2012187606-A (Okamoto, Tatsuki) Oct. 4, 2012 [retrieved on Jul. 26, 2024]. Retrieved from Espacenet Database, translation by EPO and Google. (Year: 2012).*

(Continued)

*Primary Examiner* — John J Norton
*Assistant Examiner* — Franklin Jefferson Wang
(74) *Attorney, Agent, or Firm* — Renner, Otto, Boisselle & Sklar, LLP

(57) ABSTRACT

An optimum scattering angle calculator calculates an optimum scattering angle at which molten metal is most desirably scattered at a time of piercing processing of opening a pierced hole in a sheet metal to fabricate a first product, the molten metal being not adhered to an approach path and not adhered to a processing path for a second product positioned within a search region centered on a center of the pierced hole at the optimum scattering angle. A program creator creates a processing program by adding an auxiliary code to a code for fabricating the first product, the auxiliary code indicating that, at a time of the piercing processing on the first product, a position of a laser beam in an opening of a nozzle is displaced in an angle direction of the optimum (Continued)

scattering angle from a center of the opening, the laser beam being emitted from the opening.

5 Claims, 24 Drawing Sheets

(51) Int. Cl.
  *B23K 26/08* (2014.01)
  *B23K 26/14* (2014.01)
  *B23K 26/142* (2014.01)
  *G05B 19/18* (2006.01)

(52) U.S. Cl.
  CPC ........ *B23K 26/142* (2015.10); *B23K 26/1464* (2013.01); *G05B 19/182* (2013.01); *G05B 2219/36199* (2013.01); *G05B 2219/45234* (2013.01)

(56) References Cited

FOREIGN PATENT DOCUMENTS

| JP | 11-788 A | 1/1999 |
|---|---|---|
| JP | 2003305584 A | 10/2003 |
| JP | 3761687 B2 | 3/2006 |
| JP | 2012187606 A * | 10/2012 |
| JP | 2015157303 A * | 9/2015 |

OTHER PUBLICATIONS

JP-2015157303-A (Unnan, Motoi) Sep. 3, 2015 [retrieved on Jul. 26, 2024]. Retrieved from Espacenet Database, translation by EPO and Google. (Year: 2015).*

JP-2003305584-A (Seguchi, Masaki) Oct. 28, 2003 [retrieved on Nov. 27, 2024]. Retrieved from Espacenet Database, translation by EPO and Google. (Year: 2003).*

International Search Report for corresponding Application No. PCT/JP2020/021040, mailed Aug. 4, 2020.

Written Opinion for corresponding Application No. PCT/JP2020/021040, mailed Aug. 4, 2020.

Official Action issued in the counterpart Japanese Application No. 2019-105098, drafted Jul. 21, 2020.

Extended European Search Report for corresponding EP Application No. 20818465.5 dated Jun. 24, 2022.

* cited by examiner

Fig. 10A

| SPREAD ANGLE φ | SPREAD DETERMINATION DEGREE |
|---|---|
| $270° \leq \phi$ | 0 |
| $180° \leq \phi < 270°$ | 1 |
| $135° \leq \phi < 180°$ | 2 |
| $90° \leq \phi < 135°$ | 3 |
| $45° \leq \phi < 90°$ | 4 |
| $\phi < 45°$ | 5 |

Fig. 10B

| DIRECTION ANGLE DIFFERENCE Δφ | DIRECTION DETERMINATION DEGREE |
|---|---|
| $135° \leq \Delta\phi$ | 0 |
| $90° \leq \Delta\phi < 135°$ | 1 |
| $77.5° \leq \Delta\phi < 90°$ | 2 |
| $45° \leq \Delta\phi < 77.5°$ | 3 |
| $22.5° \leq \Delta\phi < 45°$ | 4 |
| $\Delta\phi < 22.5°$ | 5 |

Fig. 11A

NOZZLE DIAMETER: 2 mm

| AMOUNT OF DISPLACEMENT (μm) | SPREAD DETERMINATION DEGREE | DIRECTION DETERMINATION DEGREE | RATING |
|---|---|---|---|
| 0 | 2 | 1 | POOR |
| 25 | 3.7 | 1.7 | POOR |
| 50 | 4.7 | 4 | FAIR |
| 100 | 4.7 | 4.3 | FAIR |
| 150 | 4.7 | 5 | GOOD |
| 250 | 5 | 5 | GOOD |
| 350 | 5 | 5 | GOOD |
| 500 | 5 | 5 | GOOD |

Fig. 11B

NOZZLE DIAMETER: 3 mm

| AMOUNT OF DISPLACEMENT (μm) | SPREAD DETERMINATION DEGREE | DIRECTION DETERMINATION DEGREE | RATING |
|---|---|---|---|
| 0 | 0 | 0 | POOR |
| 50 | 0 | 0 | POOR |
| 250 | 2.7 | 4 | FAIR |
| 450 | 3.7 | 5 | GOOD |
| 650 | 4.3 | 5 | GOOD |

PROCESSING PROGRAM CREATION DEVICE, METHOD FOR DETERMINING SCATTERING DIRECTION OF MOLTEN METAL, LASER PROCESSING MACHINE, AND LASER PROCESSING METHOD

The present application claims the benefit of priority to Japanese Patent Application No. 2019-105098, filed with the Japan Patent Office on Jun. 5, 2019, which is hereby incorporated by reference in its entirety.

TECHNICAL FIELD

The present disclosure relates to a processing program creation device, a method for determining a scattering direction of molten metal, a laser processing machine, and a laser processing method.

BACKGROUND ART

A laser processing machine that cuts a sheet metal with a laser beam that is emitted from a laser oscillator is widely used. At the time of the laser processing machine fabricating a product having a predetermined shape by cutting a sheet metal with a laser beam, the laser processing machine opens a hole called a pierced hole in a sheet metal, at a position at an outer part of the product. Subsequent to piercing processing of opening the pierced hole in the sheet metal with a laser beam, the laser processing machine performs approach processing of cutting up to a predetermined position at an outer circumference of the product, and then cuts the sheet metal along the outer circumference of the product.

CITATION LIST

Patent Literature

Patent Literature 1: Japanese Patent No. 3761687

SUMMARY

The laser processing machine performs the piercing processing or cuts the sheet metal by irradiating the sheet metal with the laser beam while blowing assist gas according to the material of the sheet metal onto the sheet metal. At the time of the approach processing or cutting along the outer circumference of the product, molten metal generated by the laser beam is blown away by the assist gas to a rear surface side of the sheet metal through a groove that is already cut. However, at the time of the piercing processing, because a groove or a hole is not formed, the molten metal is blown away by the assist gas to an upper surface of the sheet metal to be adhered to a periphery of the pierced hole (see Patent Literature 1).

The laser beam passes through the center of a circular opening of a nozzle, and the assist gas is blown onto the sheet metal through a periphery of the laser beam. If the sheet metal has a small thickness, the assist gas is applied to the molten metal approximately uniformly in a circumferential direction, and the molten metal is approximately uniformly scattered. However, if the sheet metal has a great thickness, formation of the pierced hole takes a long time, and a phenomenon is possibly caused in which a part being melted subtly moves in a planar direction. Then, the amount of molten metal becomes non-uniform in the circumferential direction by being largely distributed in a predetermined direction, and a greater amount of molten metal is scattered in the direction in which the amount is largely distributed. The direction in which the amount of molten metal is largely distributed is random, and thus, the direction in which a greater amount of molten metal is scattered is random.

Accordingly, to prevent scattered molten metal from getting adhered to the product, the pierced hole has to be formed at a position that is sufficiently away from the product. At a time of cutting a plurality of products from a sheet metal, a sufficient space for forming the pierced hole has to be provided between adjacent products. Accordingly, the maximum number of products that can be cut out cannot be increased, and the yield cannot be increased. Moreover, metal deposits (spatters) that are molten metal that is adhered and solidified around the pierced hole possibly reduce stability of the approach processing and may cause processing defects.

Accordingly, if the direction of scattering of the molten metal can be controlled at the time of the piercing processing, and a direction in which the molten metal is most desirably scattered can be automatically determined, yield may be increased and occurrence of processing defects may be made less likely. If the laser processing machine is capable of performing the piercing processing while causing the molten metal to be scattered in the most desirable direction, the yield may be increased and occurrence of processing defects may be made less likely.

One or more embodiments are directed to providing a processing program creation device that is capable of creating a processing program for enabling control of a direction in which molten metal is to be scattered at a time of piercing processing, a method for determining a scattering direction of the molten metal, the method being capable of automatically determining a most desirable direction in which the molten metal is to be scattered at the time of the piercing processing, and a laser processing machine and a laser processing method that are capable of performing the piercing processing while causing the molten metal to be scattered in the most desirable direction.

According to a first aspect of the one or more embodiments, there is provided a processing program creation device including: an optimum scattering angle calculator configured to calculate an optimum scattering angle that is an angle most desirable for scattering of molten metal in a search region at a time of piercing processing of opening a pierced hole in a sheet metal to cut the sheet metal and fabricate a first product, the molten metal being generated by melting of the sheet metal, the search region being a circle having a predetermined radius and centered on a center of the pierced hole, the molten metal being not adhered to an approach path extending to the pierced hole and not adhered to a processing path for a second product positioned within the search region at the optimum scattering angle; and a program creator configured to create a processing program by adding an auxiliary code to a code for cutting the sheet metal and fabricating the first product, the auxiliary code indicating that, at a time of the piercing processing on the first product, a position of a laser beam in an opening of a nozzle attached to a tip end of a processing head is displaced in an angle direction of the optimum scattering angle from a center of the opening, the laser beam being emitted from the opening.

According to a second aspect of the one or more embodiments, there is provided a method for determining a scattering direction of molten metal, the method including, by a computer appliance: setting a search region that is a circle having a predetermined radius and centered on a center of a pierced hole to be opened to cut a sheet metal and fabricate a first product; setting a scattering angle region having a center angle based on a spread angle of spatters determined in advance, the scattering angle region being where molten metal generated by melting of the sheet metal is scattered and spread in a fan shape to be adhered to the sheet metal when a position of a laser beam in an opening of a nozzle attached to a tip end of a processing head is displaced from a center of the opening while assist gas is being blown onto the sheet metal from the opening, the laser beam being emitted from the opening; extracting, from the search region, one or more angle regions at least having an angle range of the scattering angle region, the angle region not interfering with either an approach path extending to the pierced hole or a processing path for a second product positioned in the search region; determining a bisecting angle that is an angle at which a bisector of each angle region of the one or more angle regions is located; and determining, as an optimum scattering angle indicating an angle direction in which the molten metal is to be scattered, an angle, among the bisecting angles of the one or more angle regions, closest to an extension line obtained by extending the approach path in a direction away from the first product.

According to a third aspect of the one or more embodiments, there is provided a laser processing machine including: a processing head including a nozzle attached to a tip end, the nozzle being for emitting a laser beam from an opening; a moving mechanism configured to move the processing head along a surface of a sheet metal; a beam displacement mechanism configured to displace a position, in the opening, of the laser beam emitted from the opening; an assist gas supply device configured to supply, to the processing head, assist gas to be blown onto the sheet metal from the opening at a time of processing of the sheet metal; and a control device configured to control the beam displacement mechanism at a time of piercing processing of opening a pierced hole in the sheet metal to cut a product based on a processing program, the beam displacement mechanism being controlled such that, in a case where an auxiliary code indicating an angle direction in which the position, in the opening, of the laser beam emitted from the opening is to be displaced from a center of the opening is written in the processing program, the laser beam is displaced in the angle direction indicated by the auxiliary code.

According to a fourth aspect of the one or more embodiments, there is provided a laser processing method including, by a control device configured to control a laser processing machine: reading an auxiliary code at a time of controlling the laser processing machine based on a processing program such that piercing processing of opening a pierced hole to cut a product is performed on a sheet metal, in a case where the auxiliary code is written in the processing program, the auxiliary code indicating an angle direction in which a laser beam emitted from an opening of a nozzle attached to a tip end of a processing head is to be displaced from a center of the opening; controlling a beam displacement mechanism provided in the laser processing machine in such a manner that the laser beam with which the sheet metal is irradiated at a time of the piercing processing is displaced in the angle direction indicated by the auxiliary code; and controlling an assist gas supply device provided in the laser processing machine in such a manner that assist gas is blown onto the sheet metal from the opening at the time of the piercing processing.

With the processing program creation device according to the one or more embodiments, a processing program that is capable of controlling the direction of scattering of molten metal at the time of piercing processing may be created.

With the method for determining the scattering direction of molten metal according to the one or more embodiments, a direction in which the molten metal is most desirably scattered at the time of the piercing processing may be automatically determined. With the laser processing machine and the laser processing method according to the one or more embodiments, the piercing processing may be performed by causing the molten metal to be scattered in the most desirable direction.

BRIEF DESCRIPTION OF DRAWINGS

FIG. 10A is a diagram showing a spread determination degree defined according to the spread angle.

FIG. 10B is a diagram showing a direction determination degree defined according to the direction angle difference.

FIG. 11A is a diagram showing a relationship among an amount of displacement of the irradiation position of a laser beam on a sheet metal, the spread determination degree, the direction determination degree, and a rating, where a nozzle with a nozzle diameter of 2 mm is used.

FIG. 11B is a diagram showing the relationship among the amount of displacement of the irradiation position of a laser beam on a sheet metal, the spread determination degree, the direction determination degree, and the rating, where a nozzle with a nozzle diameter of 3 mm is used.

DESCRIPTION OF EMBODIMENTS

Figure 1:
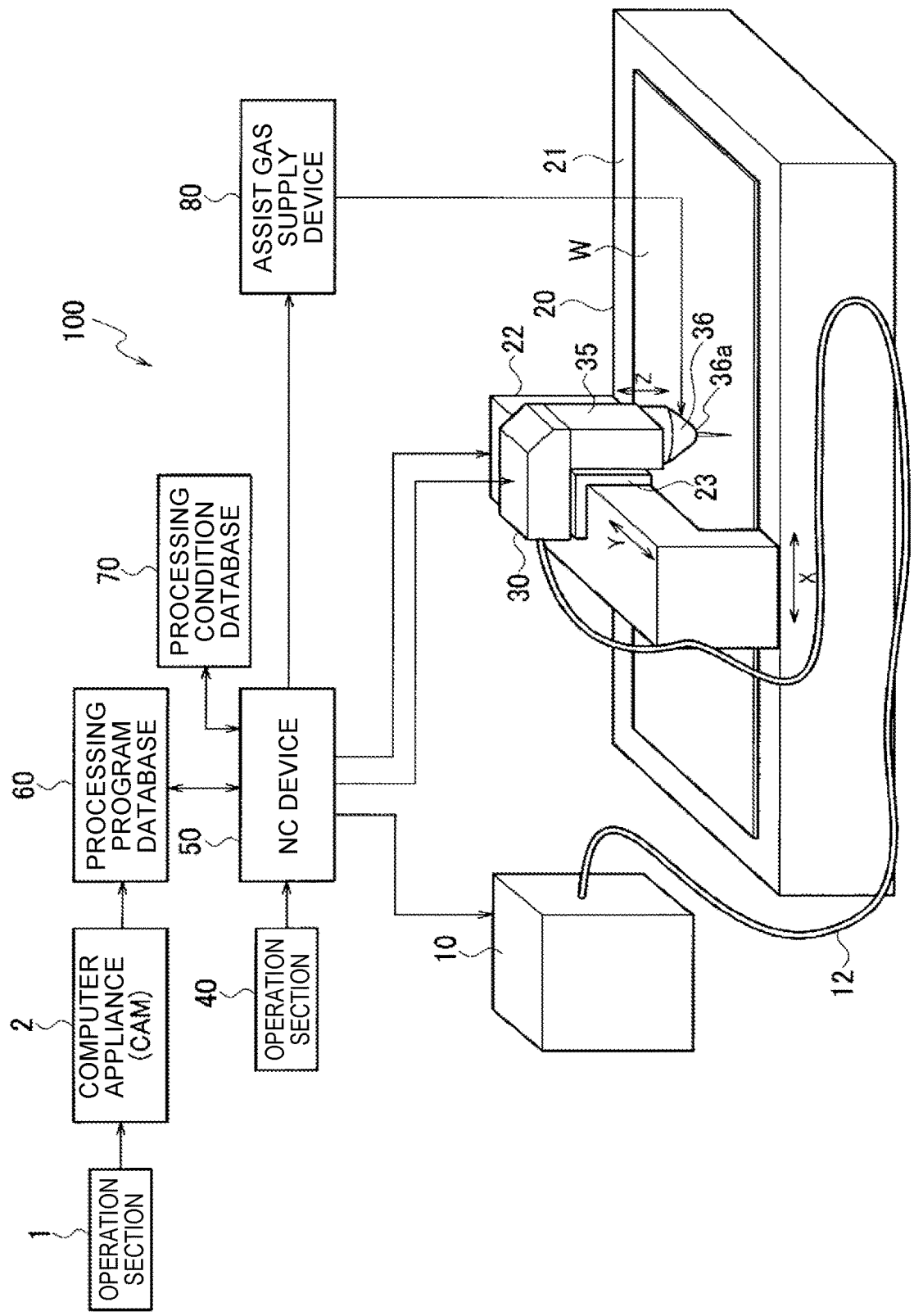
FIG. 1 is a diagram showing an overall configuration example of a laser processing machine of one or more embodiments.

Hereinafter, a processing program creation device, a method for determining a scattering direction of molten metal, a laser processing machine, and a laser processing method of one or more embodiments will be described with reference to the appended drawings. In FIG. 1, a laser processing machine 100 includes a laser oscillator 10 for generating and emitting a laser beam, a laser processing unit 20, and a process fiber 12 for transmitting the laser beam emitted from the laser oscillator 10 to the laser processing unit 20. The laser processing machine 100 further includes an operation section 1, a computer appliance 2 that executes a computer aided manufacturing (CAM) program, an operation section 40, an NC device 50, a processing program database 60, a processing condition database 70, and an assist gas supply device 80.

The operation section 1, the computer appliance 2, the processing program database 60, and the processing condition database 70 may be provided outside the laser processing machine 100. The processing program database 60 and the processing condition database 70 may be connected to the NC device 50 via a network. As described later, the computer appliance 2 is a processing program creation device that creates a processing program. The NC device 50 is an example of a control device for controlling each part of the laser processing machine 100.

As the laser oscillator 10, a laser oscillator that emits a laser beam at a predetermined wavelength by amplifying an excitation beam emitted from a laser diode, or a laser oscillator that directly uses a laser beam that is emitted from a laser diode is suitably used. For example, the laser oscillator 10 is a solid laser oscillator, a fiber laser oscillator, a disk laser oscillator, or a direct diode laser oscillator (a DDL oscillator).

The laser oscillator 10 emits a 1-μm band laser beam at a wavelength of 900 nm to 1100 nm. When taking the fiber laser oscillator and the DDL oscillator as examples, the fiber laser oscillator emits a laser beam at a wavelength of 1060 nm to 1080 nm, and the DDL oscillator emits a laser beam at a wavelength of 910 nm to 950 nm.

The laser processing unit 20 includes a processing table 21 on which to place a sheet metal W as a processing target, a gate-type X-axis carriage 22, a Y-axis carriage 23, a collimator unit 30 fixed to the Y-axis carriage 23, and a processing head 35. The X-axis carriage 22 is freely movable on the processing table 21 in an X-axis direction. The Y-axis carriage 23 is freely movable on the X-axis carriage 22 in a Y-axis direction perpendicular to an X-axis. The X-axis carriage 22 and the Y-axis carriage 23 function as a moving mechanism for moving the processing head 35 along a surface of the sheet metal W, in the X-axis direction, the Y-axis direction, or any combination direction along the X-axis and the Y-axis.

Instead of causing the processing head 35 to move along the surface of the sheet metal W, the sheet metal W may be moved while fixing a position of the processing head 35. It suffices if the laser processing machine 100 includes a moving mechanism for moving the processing head 35 relative to the surface of the sheet metal W.

A nozzle 36 including a circular opening 36a at a tip end portion is attached to the processing head 35, the nozzle 36 being for emitting a laser beam from the opening 36a. The sheet metal W is irradiated with a laser beam that is emitted from the opening 36a of the nozzle 36.

Figure 2:
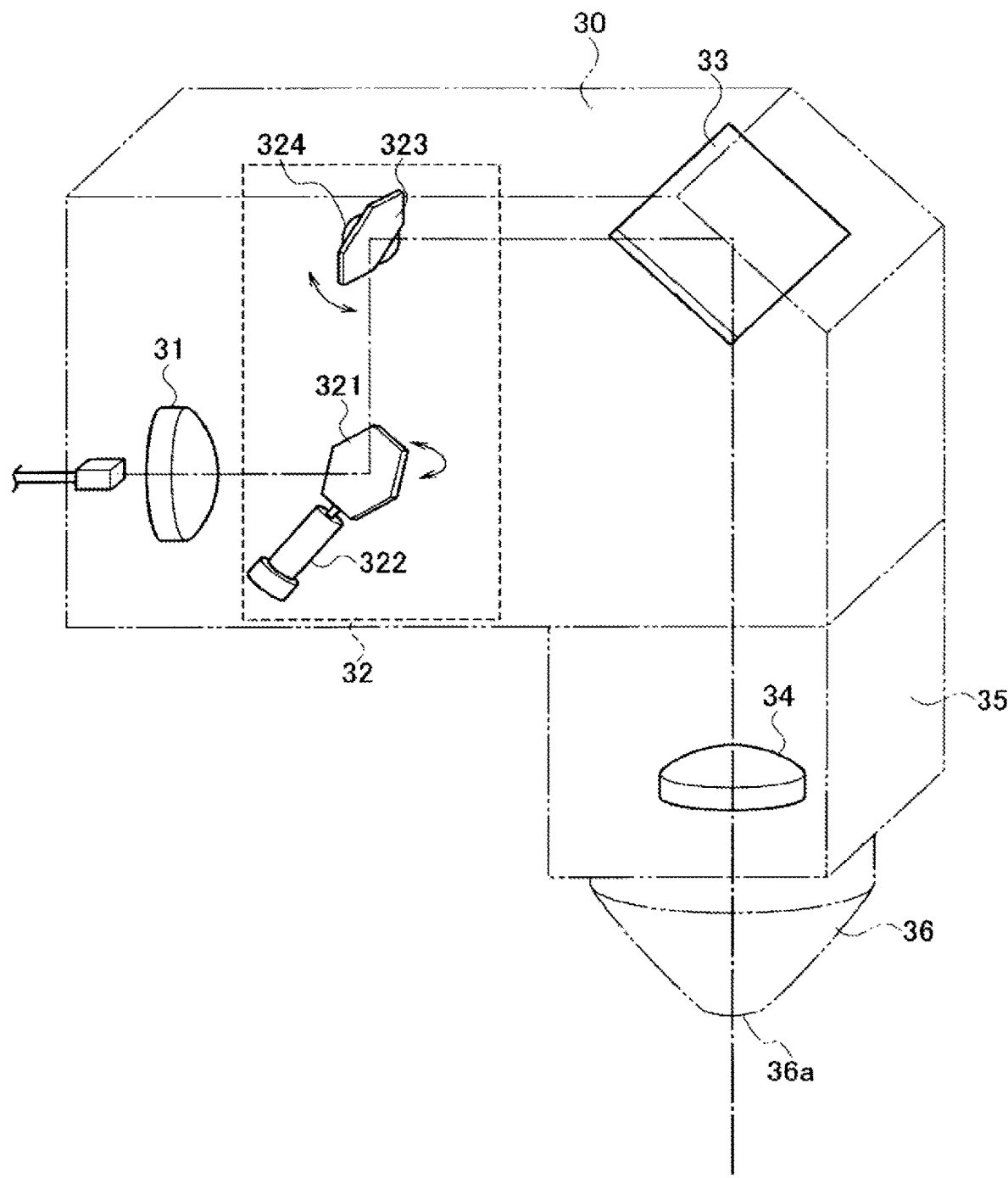
FIG. 2 is a perspective view showing an example detailed structure of a collimator unit and a processing head of the laser processing machine of the one or more embodiments.

As shown in FIG. 2, the collimator unit 30 includes a collimation lens 31 for converting a laser beam that is a divergent beam emitted from the process fiber 12 into a parallel beam (a collimated beam). The collimator unit 30 also includes a galvano scanner unit 32, and a bend mirror 33 for reflecting a laser beam emitted from the galvano scanner unit 32 downward in a Z-axis direction perpendicular to the X-axis and the Y-axis. The processing head 35 includes a focusing lens 34 for focusing a laser beam reflected by the bend mirror 33, and for irradiating the sheet metal W with the focused laser beam.

The laser processing machine 100 is aligned such that the laser beam that is emitted from the opening 36a of the nozzle 36 is positioned at a center of the opening 36a. In a standard state, the laser beam is emitted from the center of the opening 36a. The galvano scanner unit 32 functions as a beam displacement mechanism for displacing the position, inside the opening 36a, of the laser beam that proceeds through the processing head 35 to be emitted from the opening 36a. As a result, the galvano scanner unit 32 displaces the position, on the sheet metal W, that is to be irradiated with the laser beam to a position that is away from a position immediately below the center of the opening 36a by a predetermined distance.

The galvano scanner unit 32 is an example of the beam displacement mechanism, and the beam displacement mechanism is not limited to the galvano scanner unit 32.

The galvano scanner unit 32 includes a scanning mirror 321 for reflecting the laser beam emitted through the collimation lens 31, and a driver 322 for rotating the scanning mirror 321 to a predetermined angle. The galvano scanner unit 32 also includes a scanning mirror 323 for reflecting the laser beam emitted from the scanning mirror 321, and a driver 324 for rotating the scanning mirror 323 to a predetermined angle.

The laser processing machine 100 configured in the above manner fabricates a product having a predetermined shape by cutting the sheet metal W with a laser beam emitted from the laser oscillator 10. At this time, the laser processing machine 100 performs piercing processing on a position, on the sheet metal W, outside the product with a laser beam, and cuts a linear approach path from a pierced hole to a predetermined position on an outer circumference of the product. The laser processing machine 100 fabricates the product by cutting the sheet metal along the outer circumference of the product when the laser beam reaches the predetermined position on the outer circumference of the product that is an end of the approach path on the product side.

Next, a description will be given of a specific method for controlling a direction around a pierced hole in which molten metal is to be adhered, at a time when the piercing processing is performed on the sheet metal W while blowing assist gas onto the sheet metal W. The laser processing machine 100 may reduce the amount of molten metal adhered to the product side, by controlling the direction around the pierced hole in which the molten metal is to be attached. The laser processing machine 100 may also prevent molten metal from getting adhered on the product side around the pierced hole.

Figure 3A:
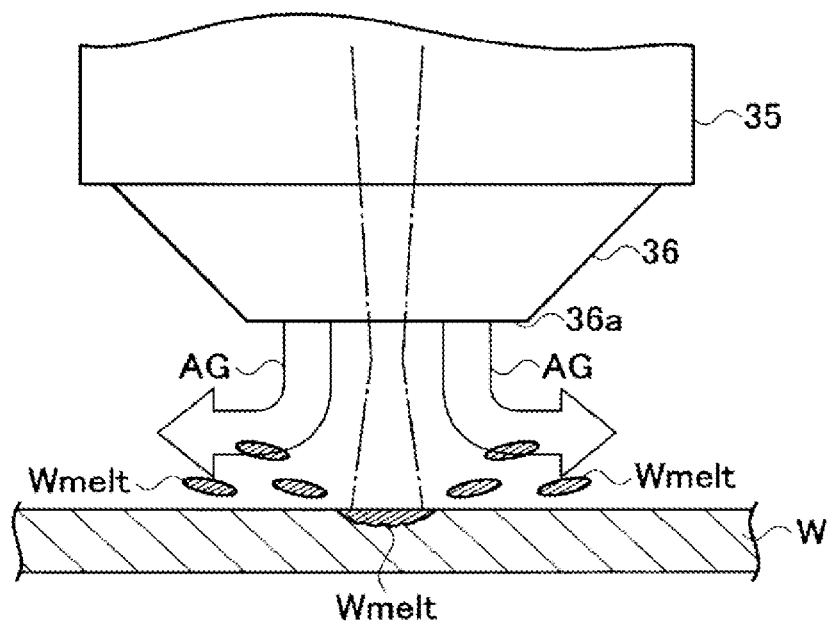
FIG. 3A is a side view conceptually showing a piercing processing operation, where a sheet metal has a small thickness.
Figure 3B:
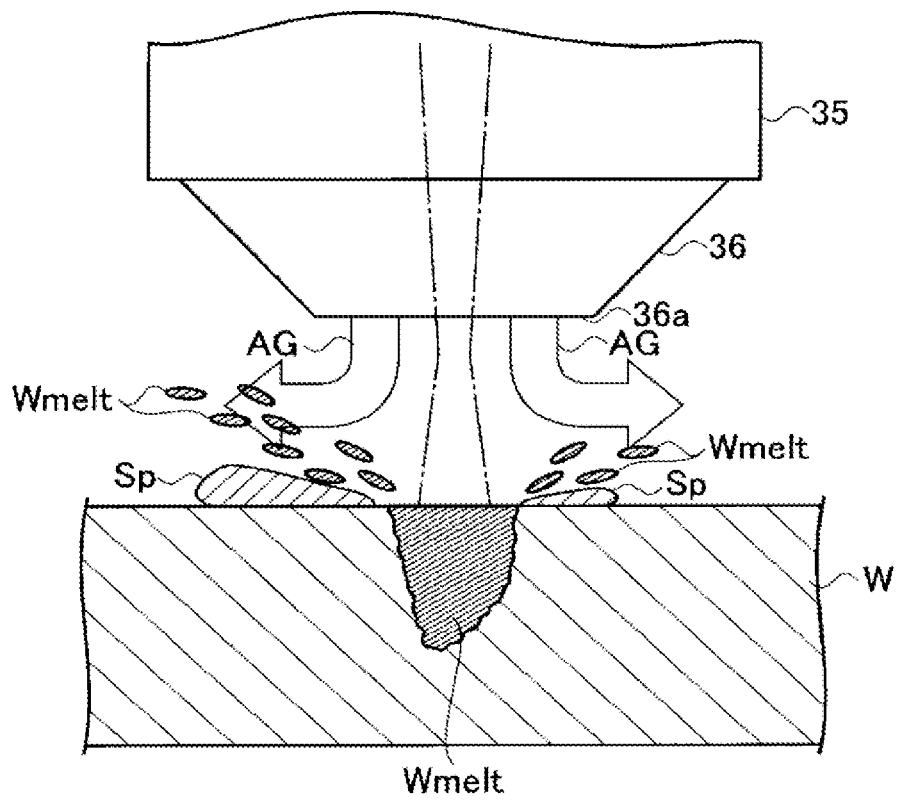
FIG. 3B is a side view conceptually showing the piercing processing operation, where the sheet metal has a great thickness.

FIGS. 3A and 3B conceptually show a piercing processing operation performed on the sheet metal W using a typical laser processing method. That is, there is shown a piercing processing operation according to which the center of the opening 36a is positioned immediately above a position where the piercing processing is to be performed, where the sheet metal W is irradiated with the laser beam at immediately below the center of the opening 36a. FIG. 3A shows a case where the sheet metal W has a small thickness, and FIG. 3B shows a case where the sheet metal W has a great thickness.

In FIG. 3A, at the time of the piercing processing on the sheet metal W, the NC device 50 raises the processing head 35 to separate the nozzle 36 from the sheet metal W. Accordingly, a beam waist of the laser beam indicated by a dash-dotted line is positioned above and away from the sheet metal W. Additionally, depending on how a lens is adjusted, the beam waist may be set on the surface of or inside the sheet metal W, and a position of the beam waist may be freely selected.

The sheet metal W is irradiated with the laser beam having passed through the center of the opening 36a, and metal at an irradiation position is melted into molten metal Wmelt by heat from the laser beam. Assist gas AG supplied to the processing head 35 by the assist gas supply device 80 passes through the opening 36a to be blown onto the sheet metal W. The assist gas AG is applied to the molten metal Wmelt approximately uniformly in a circumferential direction, and the molten metal Wmelt is approximately uniformly scattered around a position to be the pierced hole. Additionally, the molten metal Wmelt that is scattered and a metal deposit adhered and solidified on the sheet metal W may both be referred to as a spatter, but in the one or more embodiments, the metal deposit is referred to as the spatter.

In FIG. 3B where the sheet metal W has a great thickness, formation of the pierced hole takes a long time, and a phenomenon is possibly caused in which a part that is immediately below the center of the opening 36a and that is being melted subtly moves in a planar direction. Then, the amount of molten metal Wmelt becomes non-uniform in the circumferential direction by being largely distributed in a predetermined direction, and a greater amount of molten metal Wmelt is scattered in the direction in which the amount is largely distributed.

FIG. 3B shows a state where a greater amount of molten metal Wmelt is scattered in a left direction in the drawing, and more spatters Sp are adhered in the left direction from the position where the pierced hole is to be formed. The direction in which the amount of molten metal Wmelt is to be largely distributed is random, and thus, the direction in which many spatters Sp are to be adhered due to scattering of a great amount of molten metal Wmelt is random.

Figure 4:
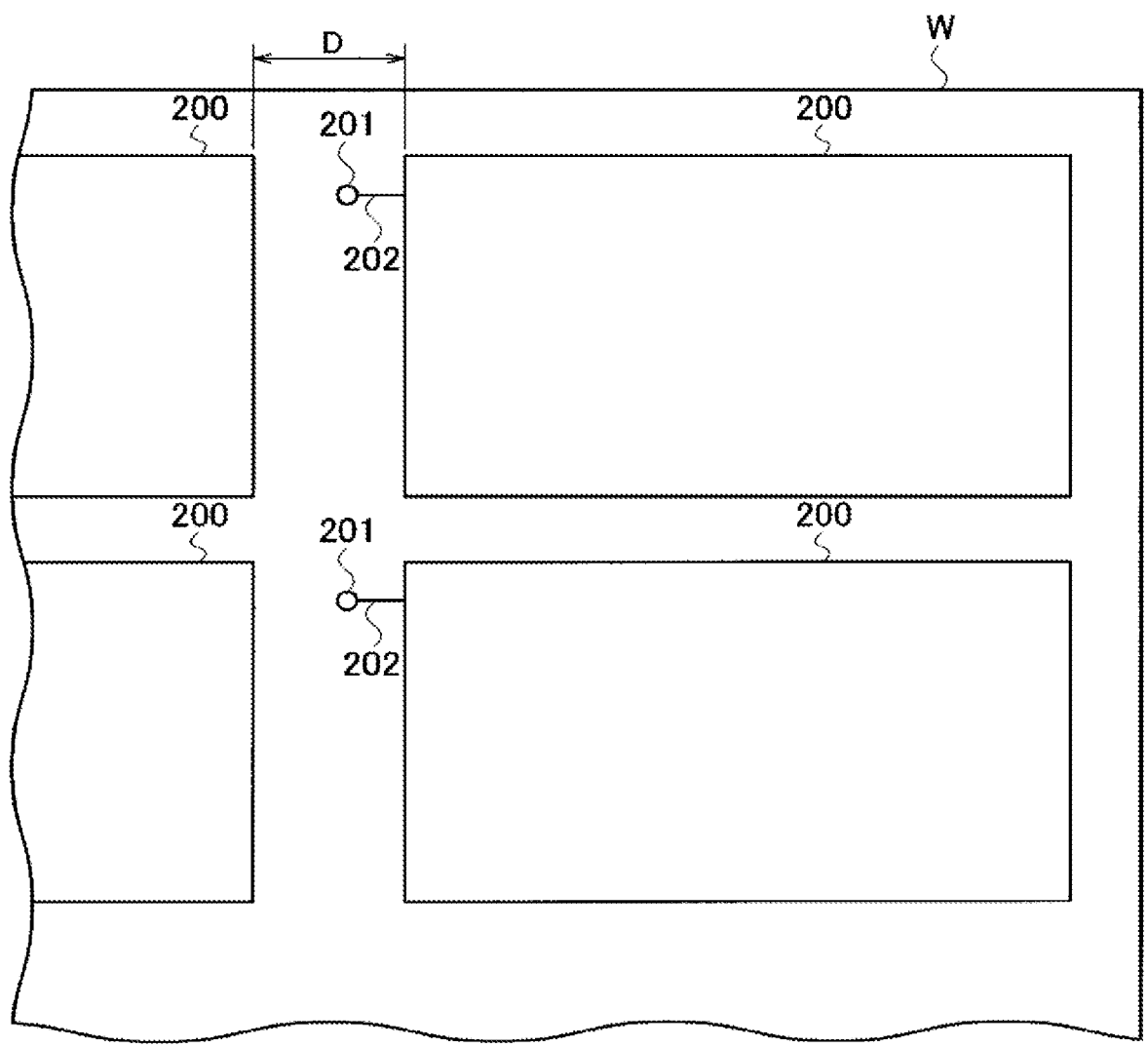
FIG. 4 is a partial plan view showing a state where a blank layout of a plurality of rectangular products is created on a sheet metal.

A case will be considered, as shown in FIG. 4, where a blank layout of a plurality of rectangular products 200 is created on the sheet metal W, and where each product 200 is to be cut by the laser processing machine 100. The computer appliance 2 creates a processing program for performing the piercing processing and opening a pierced hole 201 at a position shown in FIG. 4, cutting an approach path 202 after opening the pierced hole 201, and cutting the sheet metal W along an outer circumference of the product 200 after cutting the approach path 202 up to an edge portion of the product 200. The processing program is stored in the processing program database 60.

The NC device 50 reads out the processing program from the processing program database 60, and performs selection from a plurality of processing conditions stored in the processing condition database 70. The NC device 50 controls the laser processing machine 100 such that the sheet metal W is processed based on the processing program that is read out and the processing condition that is selected.

Figure 5A:
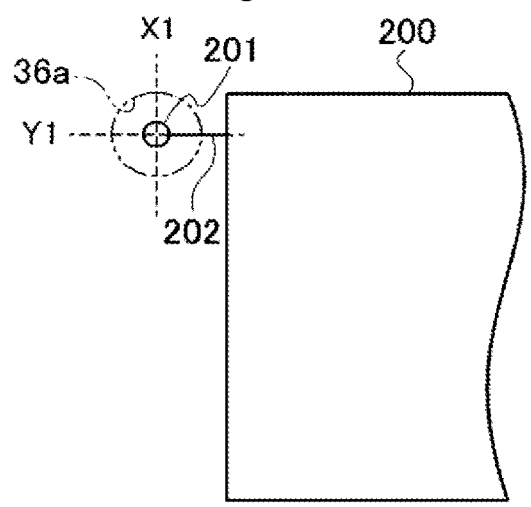
FIG. 5A is a partial plan view showing a relationship between a position of piercing and a position of a nozzle at a time of typical piercing processing.

As shown in FIG. 5A, the position where the piercing processing is to be performed to open the pierced hole 201 is set by the processing program to coordinates (X1, Y1) on the sheet metal W. In the case where the laser beam is to be emitted from the center of the opening 36a, the NC device 50 may position the processing head 35 such that the center of the opening 36a is positioned at the coordinates (X1, Y1). When the center of the opening 36a is positioned at the coordinates (X1, Y1), the center of the opening 36a is positioned immediately above the position where the pierced hole 201 is to be opened.

Figure 5B:
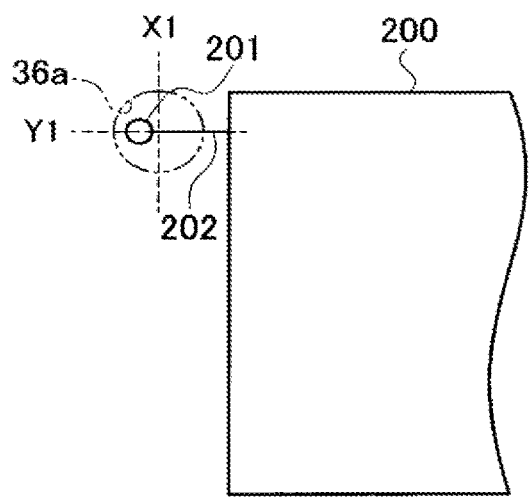
FIG. 5B is a partial plan view showing a first example of a relationship between a position of piercing and a position of a nozzle at a time of piercing processing by a laser processing machine and a laser processing method of the one or more embodiments.

In the one or more embodiments, as shown in FIG. 5B, to control the direction in which the molten metal Wmelt is scattered and the spatter Sp is adhered, the NC device 50 positions the processing head 35 such that the center of the opening 36a is positioned at the coordinates (X1, Y1). In addition, the NC device 50 changes the angle of the scanning mirror 321 or 323 of the galvano scanner unit 32 such that the position, on the sheet metal W, that is to be irradiated with the laser beam is positioned on an extended line of the approach path 202 and on a side away from the product 200 than the coordinates (X1, Y1). As a result, the position, on the sheet metal W, that is to be irradiated with the laser beam is displaced to a side away from the product 200 instead of being immediately below the center of the opening 36a.

Figure 5C:
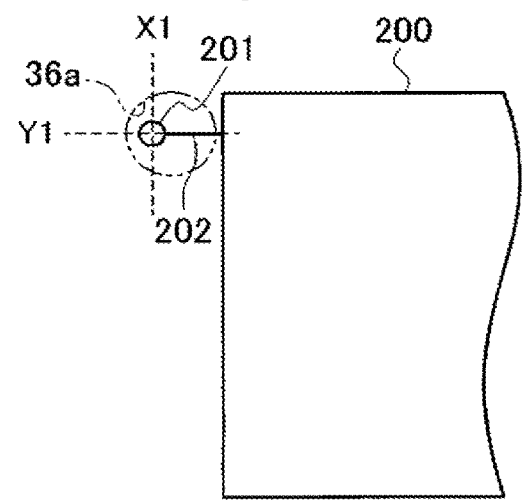
FIG. 5C is a partial plan view showing a second example of the relationship between the position of piercing and the position of the nozzle at a time of the piercing processing by the laser processing machine and the laser processing method of the one or more embodiments.

Instead of FIG. 5B, the NC device 50 may control the processing head 35 and the galvano scanner unit 32 in the manner shown in FIG. 5C. As shown in FIG. 5C, the NC device 50 causes the processing head 35 to be displaced along the approach path 202 to be on the product 200 side such that the center of the opening 36a is positioned immediately above a position, on the approach path 202, displaced from the coordinates (X1, Y1) toward the product 200. In addition, the NC device 50 changes the angle of the scanning mirror 321 or 323 of the galvano scanner unit 32 such that the position, on the sheet metal W, that is to be irradiated with the laser beam comes at the coordinates (X1, Y1). As a result, the position, on the sheet metal W, that is to be irradiated with the laser beam is displaced not to immediately below the center of the opening 36a, but to a side away from the product 200.

Figure 6:
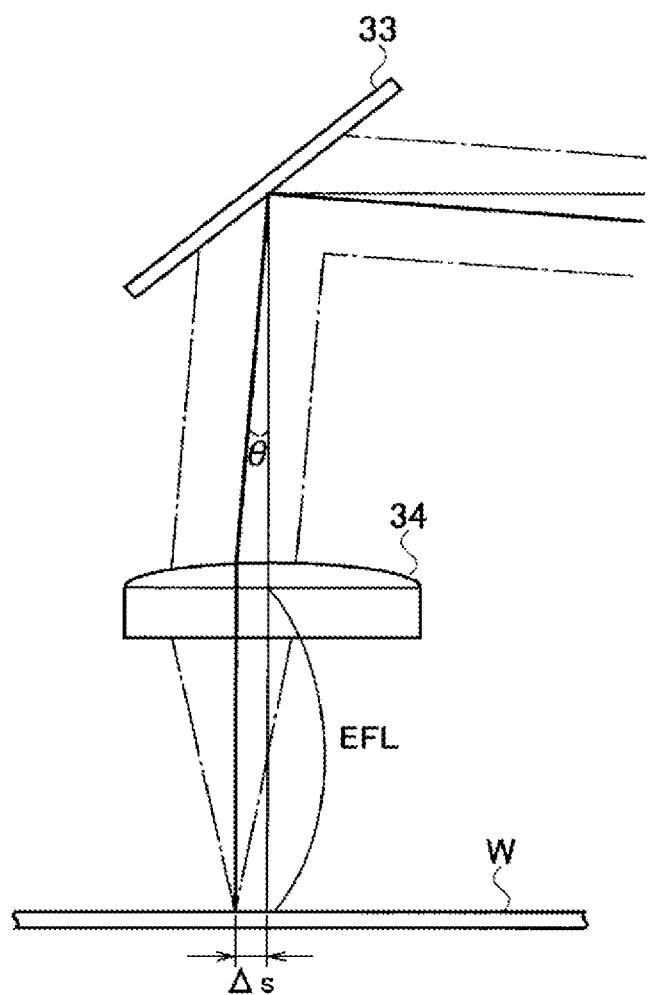
FIG. 6 is a diagram for describing displacement, by a beam displacement mechanism, of an irradiation position of a laser beam on a sheet metal.

In FIG. 6, a fine solid line that is bent by the bend mirror 33 and that passes through the focusing lens 34 indicates an optical axis of the laser beam in a standard state of the laser processing machine 100. It is assumed that, due to the action of the galvano scanner unit 32, the optical axis of the laser beam is displaced from the position indicated by the fine solid line to a position indicated by a thick solid line. When the laser beam reflected by the bend mirror 33 is inclined at an angle θ, the irradiation position of the laser beam on the sheet metal W is displaced by a distance Δs.

Additionally, more specifically, due to the action of the galvano scanner unit 32 positioned before the bend mirror 33, an angle of the optical axis of the laser beam entering the bend mirror 33 is changed, and the optical axis is shifted from a center of the bend mirror 33. For the sake of simplicity, in FIG. 6, an incident position of the laser beam on the bend mirror 33 is shown to be at a same position before and after the action of the galvano scanner unit 32.

When a focal length of the focusing lens 34 is given as an effective focal length (EFL), the distance Δs is calculated by EFL×sin θ. The NC device 50 may simply tilt the optical axis of the laser beam by the angle θ by the galvano scanner unit 32 such that the laser beam is displaced by the distance Δs that is set in advance. The distance Δs is a distance that is smaller than a radius of the opening 36a, and is preferably a distance that is equal to or smaller than a maximum distance, where the maximum distance is a distance obtained by subtracting a predetermined margin from the radius of the opening 36a. Additionally, the focal length EFL of the focusing lens 34 is much greater than the distance Δs and is 120 mm, 190 mm or the like, for example, whereas the distance Δs is a distance of several tens to hundreds of micrometers. Accordingly, there is practically no problem in calculating the distance Δs using the EFL without using an optical path length from the bend mirror 33 and without taking into account a refractive index of the focusing lens 34.

Furthermore, to be precise, when the irradiation position of the laser beam on the sheet metal W is displaced by the distance Δs by the galvano scanner unit 32, the position of the beam waist that is set in a state where the irradiation position of the laser beam is not displaced is shifted in a thickness direction of the sheet metal W. The distance Δs is a distance of several tens to hundreds of micrometers, and thus, a shift in the position of the beam waist is not likely to cause a problem. In the case where the position of the beam waist needs to be adjusted, the focusing lens 34 may simply be displaced in the Z-axis direction, for example.

Figure 7:
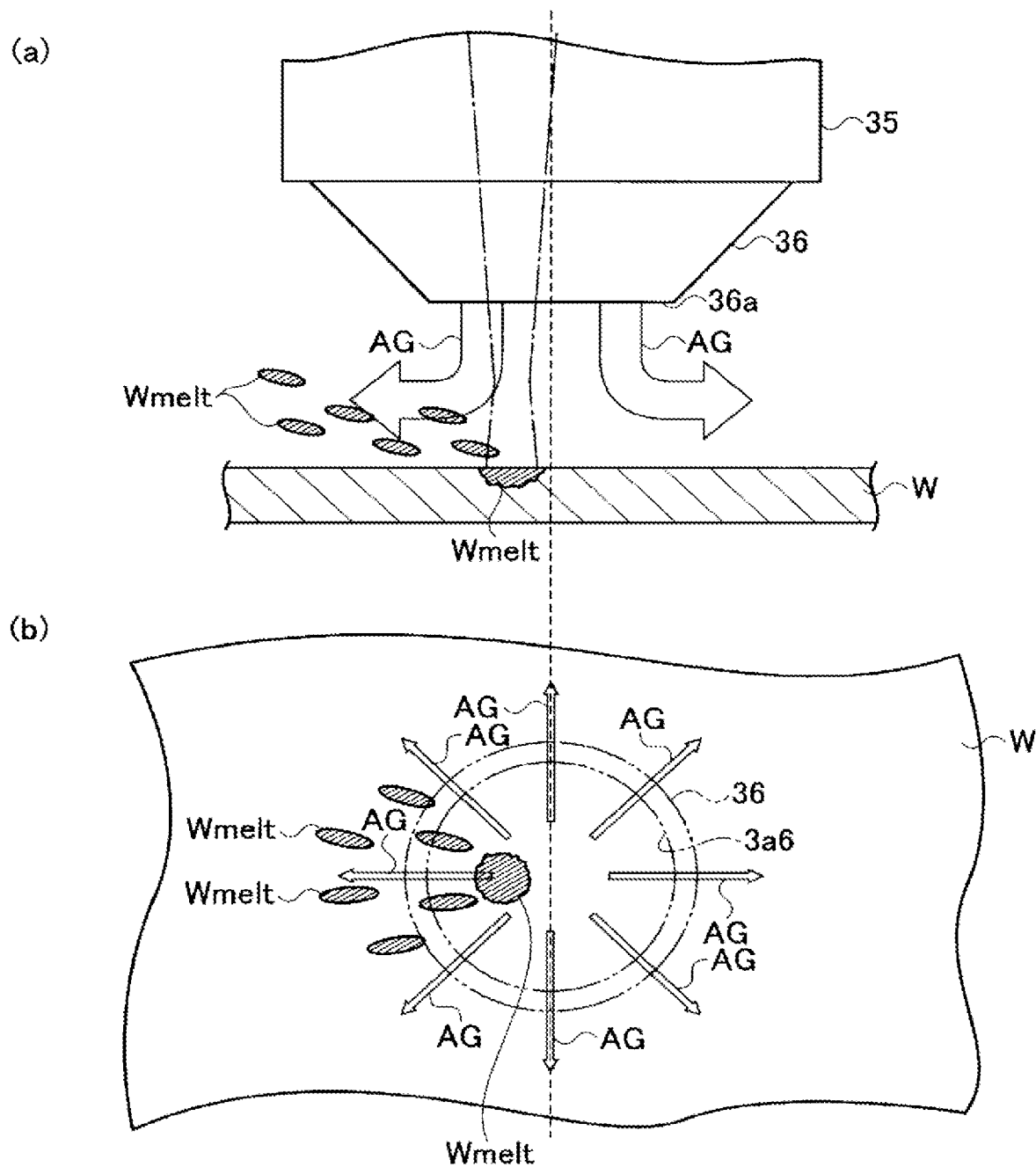
FIG. 7 includes a side view and a plan view showing a manner of scattering of molten metal when the irradiation position of a laser beam on a sheet metal is displaced by the beam displacement mechanism.

In FIG. 7, (a) conceptually shows an operation of opening a pierced hole in the sheet metal W by a laser beam that is displaced from the center of the opening 36a to an outer side when seen from a lateral direction of the processing head 35, and (b) conceptually shows a state where the sheet metal W is seen from above the sheet metal W. As shown in FIG. 7, the assist gas AG is blown onto the sheet metal W uniformly in the circumferential direction, but the laser beam with which the sheet metal W is irradiated is displaced, and thus, the molten metal Wmelt is scattered in the direction in which the laser beam is displaced.

As in FIG. 3A, (a) in FIG. 7 shows a case where the sheet metal W has a small thickness, but the same can be said for a case where the sheet metal W has a great thickness. Even in a case where the sheet metal W has a great thickness, and the amount of molten metal Wmelt is largely distributed on the product 200 side, the distance Δs by which the laser beam is displaced on the sheet metal W is much greater than a distance by which the amount of molten metal Wmelt is largely distributed, and thus, the molten metal Wmelt is scattered in the direction in which the laser beam is displaced.

Figure 8:
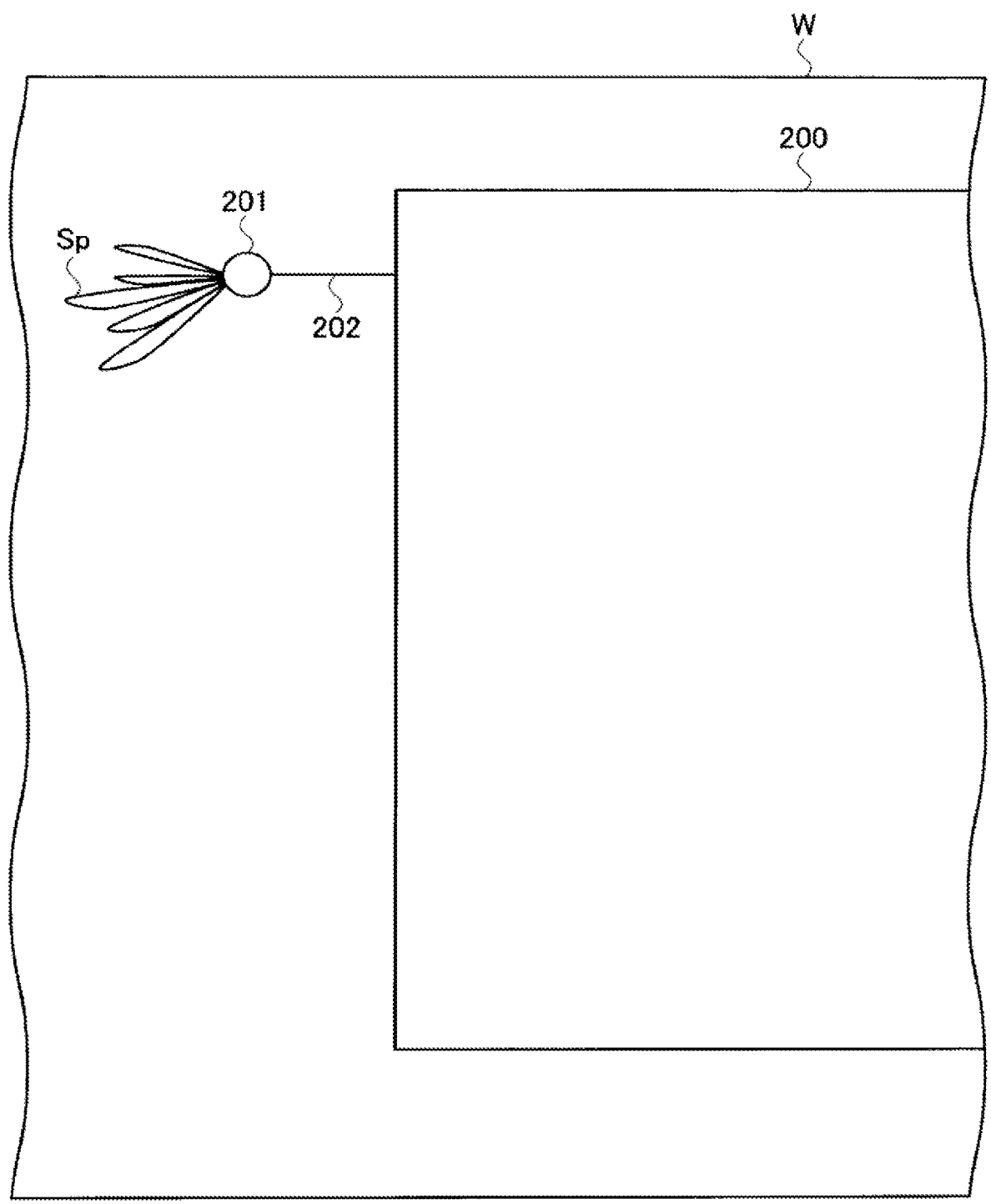
FIG. 8 is a partial plan view showing an example of an adhered state of spatters when the piercing processing is performed by the laser processing machine and the laser processing method of the one or more embodiments.

According to the one or more embodiments, as shown in FIG. 8, control may be performed in such a way that the spatters Sp are adhered to the sheet metal W at around the pierced hole 201, on an opposite side from the product 200, and that the spatters Sp are hardly adhered on the product 200 side. Accordingly, the pierced hole 201 may be opened near the product 200, and thus, a gap D between adjacent products 200 as shown in FIG. 4 may be reduced. As a result, the one or more embodiments may increase the yield.

According to the one or more embodiments, the spatters Sp are hardly adhered to the approach path 202, and thus, the approach processing may be stably performed, and possibility of occurrence of processing defects may be reduced.

Figure 9:
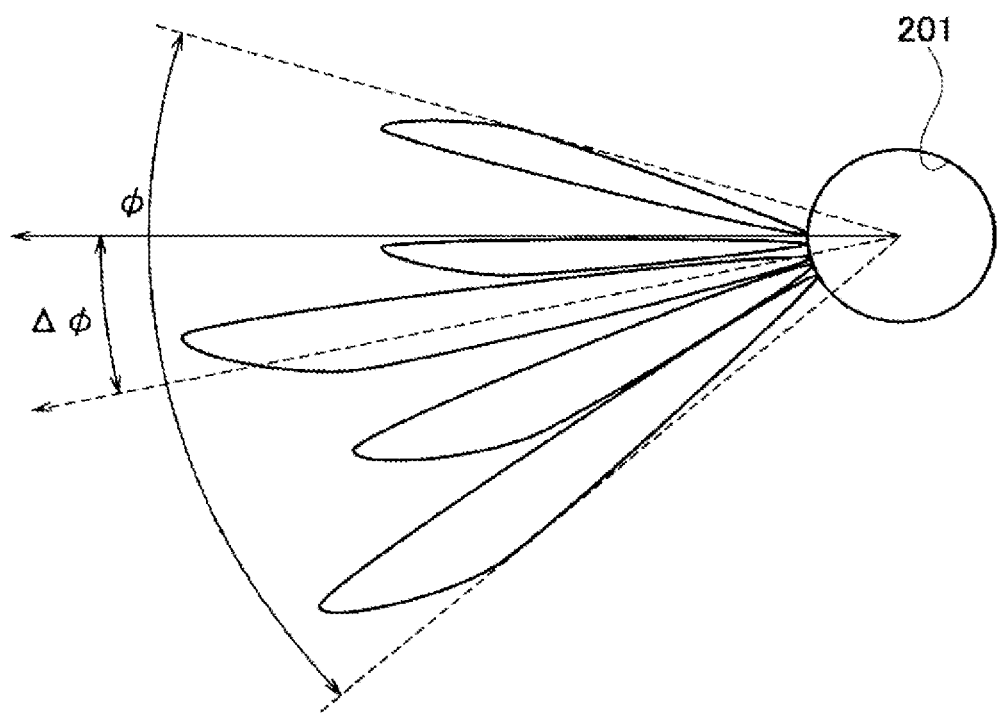
FIG. 9 is a diagram giving definitions of a spread angle of spatters that are adhered around a pierced hole and a direction angle difference.

As shown in FIG. 9, in a state where the spatters Sp are adhered around the pierced hole 201, an angle of fan-shaped spread of the spatters Sp is given as a spread angle φ, and a difference between a direction in which the laser beam is displaced and an angle direction at a center of the spatters Sp that are spread in a fan shape is given as a direction angle difference Δφ. It can be said that the smaller the spread angle φ and the direction angle difference Δφ, the better controlled the direction of adhesion of the molten metal Wmelt is.

A correspondence between the spread angle φ and a spread determination degree is defined as shown in FIG. 10A. For example, the spread angles φ of 270 degrees or more, 180 degrees or more and less than 270 degrees, 135 degrees or more and less than 180 degrees, 90 degrees or more and less than 135 degrees, 45 degrees or more and less than 90 degrees, and less than 45 degrees correspond to the spread determination degrees 0, 1, 2, 3, 4, and 5, respectively. The greater the spread determination degree, the better.

A correspondence between the direction angle difference Δφ and a direction determination degree is defined as shown in FIG. 10B. For example, the direction angle differences Δφ of 135 degrees or more, 90 degrees or more and less than 135 degrees, 77.5 degrees or more and less than 90 degrees, 45 degrees or more and less than 77.5 degrees, 22.5 degrees or more and less than 45 degrees, and less than 22.5 degrees correspond to the direction determination degrees 0, 1, 2, 3, 4, and 5, respectively. The greater the direction determination degree, the better.

In FIGS. 11A and 11B, a distance by which the position, on the sheet metal W, that is to be irradiated with the laser beam is displaced from the position immediately below the center of the opening 36a is given as an amount of displacement. The distance Δs described in FIG. 6 is the amount of displacement. The spread determination degree and the direction determination degree in FIGS. 11A and 11B each indicate an average value where the piercing processing is performed three times.

FIG. 11A shows a relationship among the amount of displacement, the spread determination degree, the direction determination degree, and a rating, where the piercing processing is performed on the sheet metal W that is stainless steel having a thickness of 6 mm, by using the nozzle 36 with a nozzle diameter of 2 mm and with a laser power of 4 kW.

As shown in FIG. 11A, in the case where the nozzle diameter is 2 mm, up to the amount of displacement of 25 μm, the spread determination degree and the direction determination degree are small and the rating is "poor." When the amount of displacement is 50 μm to 100 μm, the spread determination degree and the direction determination degree are both increased, and the rating is "fair." When the amount of displacement is 150 μm or more, the spread determination degree and the direction determination degree each take a value of 5 or a value close to 5, and the rating is "good." In the case of using the nozzle 36 with a nozzle diameter of 2 mm, the amount of displacement is preferably 50 μm or more, and is, more preferably, 150 μm or more.

FIG. 11B shows the relationship among the amount of displacement, the spread determination degree, the direction determination degree, and the rating, where the piercing processing is performed on the sheet metal W under the same condition as in FIG. 11A, but with the nozzle 36 with a nozzle diameter of 3 mm.

As shown in FIG. 11B, in the case where the nozzle diameter is 3 mm, up to the amount of displacement of 50 μm, the spread determination degree and the direction determination degree are both 0 and the rating is "poor." When the amount of displacement is 250 μm, the spread determination degree and the direction determination degree are both increased, and the rating is "fair." When the amount of displacement is 450 μm or 650 μm, the spread determination degree takes a value of around 4 and the direction determination degree takes a value of 5, and the rating is "good." In the case of using the nozzle 36 with a nozzle diameter of 3 mm, the amount of displacement is preferably 250 μm or more, and is, more preferably, 450 μm or more.

The NC device 50 may displace the position, on the sheet metal W, that is to be irradiated with the laser beam from the position immediately below the center of the opening 36a, by the amount of displacement that is optimally set according to conditions including the nozzle diameter, a shape of the nozzle 36, a nozzle gap at the time of the piercing processing, a gas pressure of the assist gas and the like.

Now, in the example described above, at the time of opening the pierced hole 201, the laser beam with which the sheet metal W is irradiated is displaced along the approach path 202, in a direction away from the product 200. Depending on a position of a processing path (a cutting path) for another product present near the pierced hole 201, the laser beam is possibly more desirably displaced in a direction different from the direction along the approach path 202.

Accordingly, an optimum scattering angle indicating a most desirable direction in which the molten metal is to be scattered is desirably automatically determined at the time of the piercing processing, and the laser beam is desirably displaced in the direction of the optimum scattering angle that is determined.

The computer appliance 2 that is the processing program creation device creates a processing program for enabling automatic determination of the optimum scattering angle and displacement of the laser beam in the direction of the determined optimum scattering angle. A specific configuration of the computer appliance 2 will be described with reference to FIG. 12, and layout of a processing path for a product (a part) and blank layout of parts on the sheet metal W (a sheet) will be described with reference to FIGS. 13 and 14.

Figure 12:
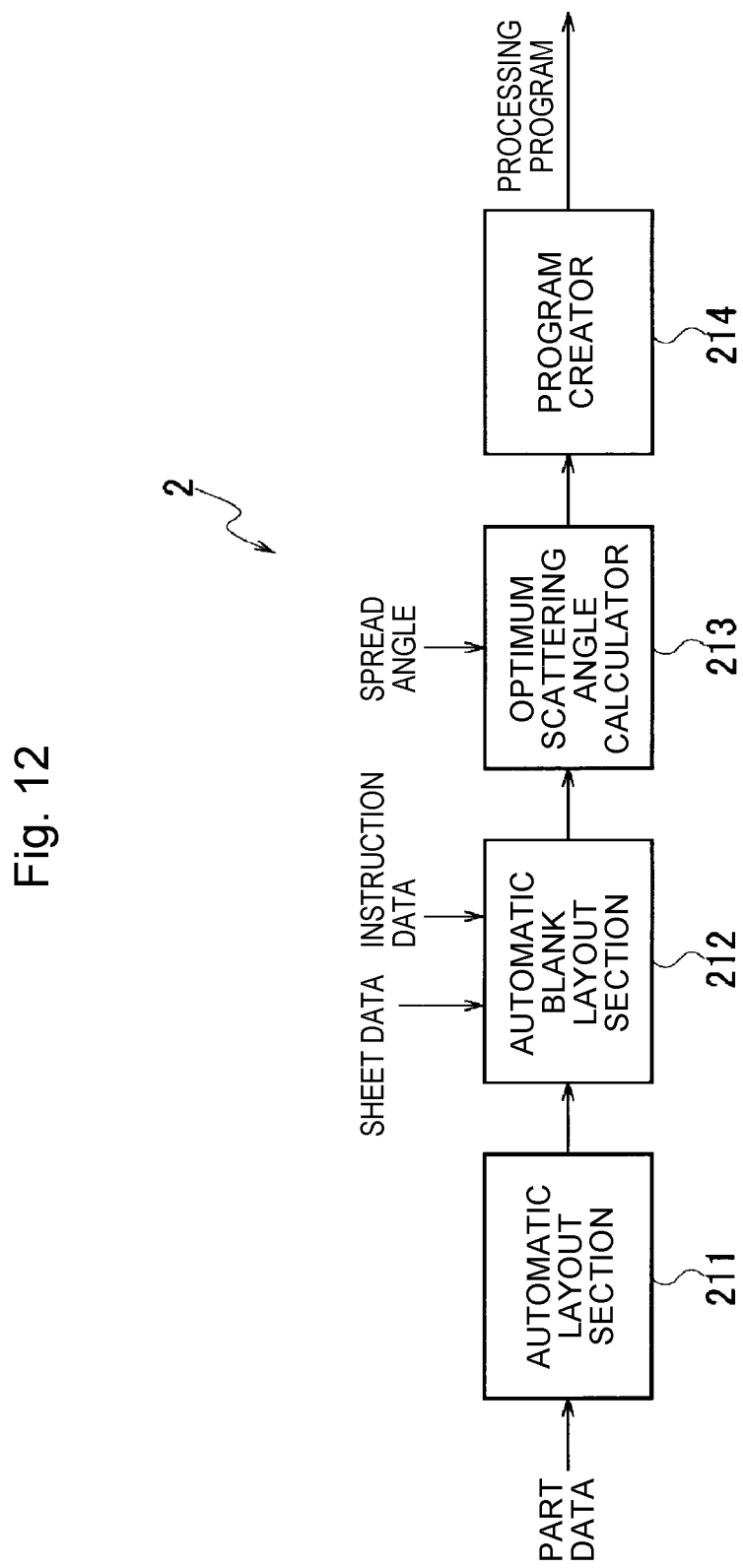
FIG. 12 is a block diagram showing a specific configuration example of a computer appliance configuring a processing program creation device of the one or more embodiments.

As shown in FIG. 12, the computer appliance 2 includes an automatic layout section 211, an automatic blank layout section 212, an optimum scattering angle calculator 213, and a program creator 214. The automatic layout section 211 to the program creator 214 may be configured by a CAM program. Part data that is CAD data created by a computer appliance, not shown, that executes a computer aided design (CAD) program is input to the automatic layout section 211. The part data is shape data of one product such as the product 200. The computer appliance 2 may be the computer appliance that executes the CAD program. That is, the computer appliance 2 may be a CAD/CAM appliance that executes the CAD and CAM programs.

Figure 13:
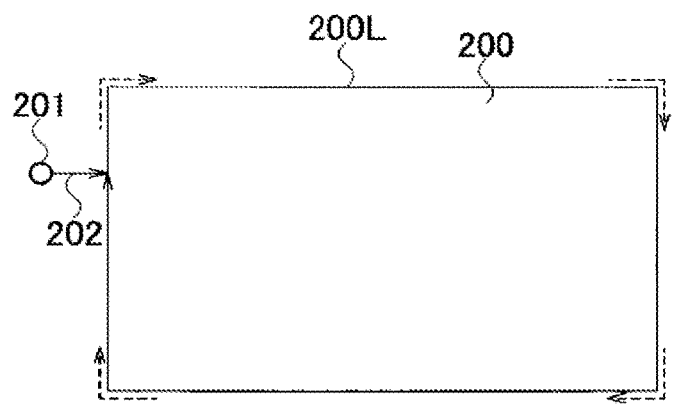
FIG. 13 is a diagram showing layout of a processing path for a product (a part).

As shown in FIG. 13, when taking the product 200 shown in FIG. 4 as an example, the automatic layout section 211 creates layout data by laying out a processing path for cutting the approach path 202 subsequent to the piercing processing of opening the pierced hole 201 and then cutting the sheet metal W along an outer circumference 200L of the product 200.

Figure 14:
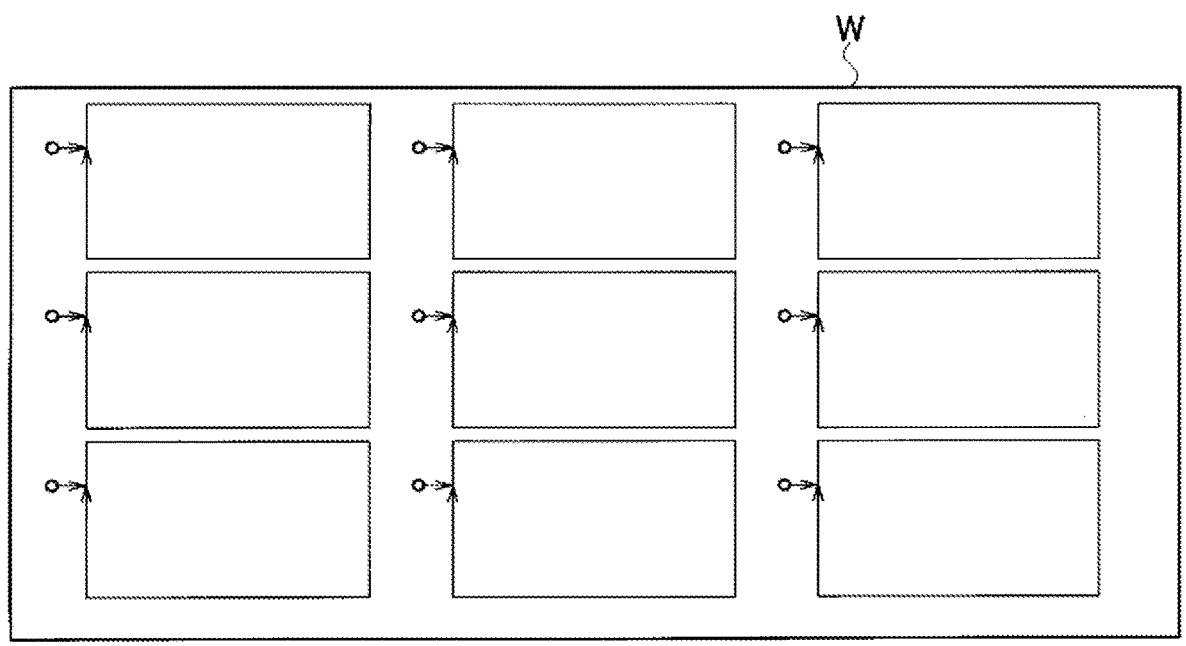
FIG. 14 is a diagram showing blank layout of parts on a sheet metal (a sheet).
Figure 15:
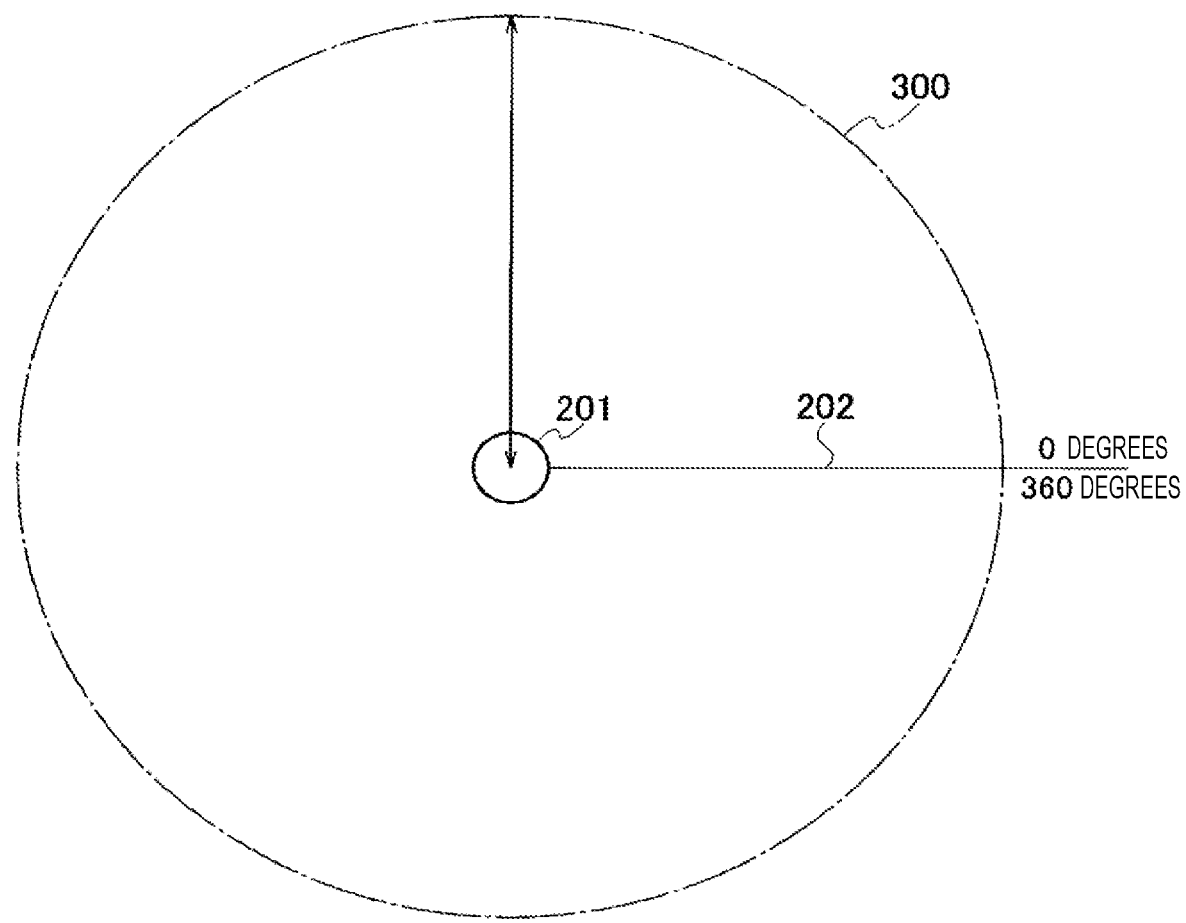
FIG. 15 is a diagram showing a search region that is a circle having a predetermined radius and centered on a center of a pierced hole.

Sheet data indicating the sheet metal W, and instruction data indicating the number of products 200 to be cut from the sheet metal W are input to the automatic blank layout section 212. The number of products 200 to be cut is instructed by the operation section 1. For example, in the case where the number of pieces is nine, the automatic blank layout section 212 creates blank layout data for cutting out nine products 200 from the sheet metal W, as shown in FIG. 14, based on the layout data for the sheet metal W shown in FIG. 13.

The optimum scattering angle calculator 213 calculates the optimum scattering angle of molten metal for when opening each pierced hole 201, based on the blank layout data created by the automatic blank layout section 212. The program creator 214 creates a processing program by including an auxiliary code indicating the optimum scattering angle calculated by the optimum scattering angle calculator 213. The processing program is transmitted to and stored in the processing program database 60.

A method of the one or more embodiments for determining the scattering direction of molten metal will be described with reference to FIGS. 15 to 21, the method being for calculating the optimum scattering angle and determining the direction in which molten metal is to be scattered. The optimum scattering angle calculator 213 sets a search region 300 that is a circle having a predetermined radius r and centered on the center of the pierced hole 201. The radius r is 10 mm, for example. The optimum scattering angle calculator 213 defines an angle in a circumferential direction of the search region 300, where the position of the approach path is at 0 degrees. In the example shown in FIG. 15, 0 to 360 degrees are set in a counterclockwise direction, where the approach path 202 is seen from the pierced hole 201.

Figure 16:
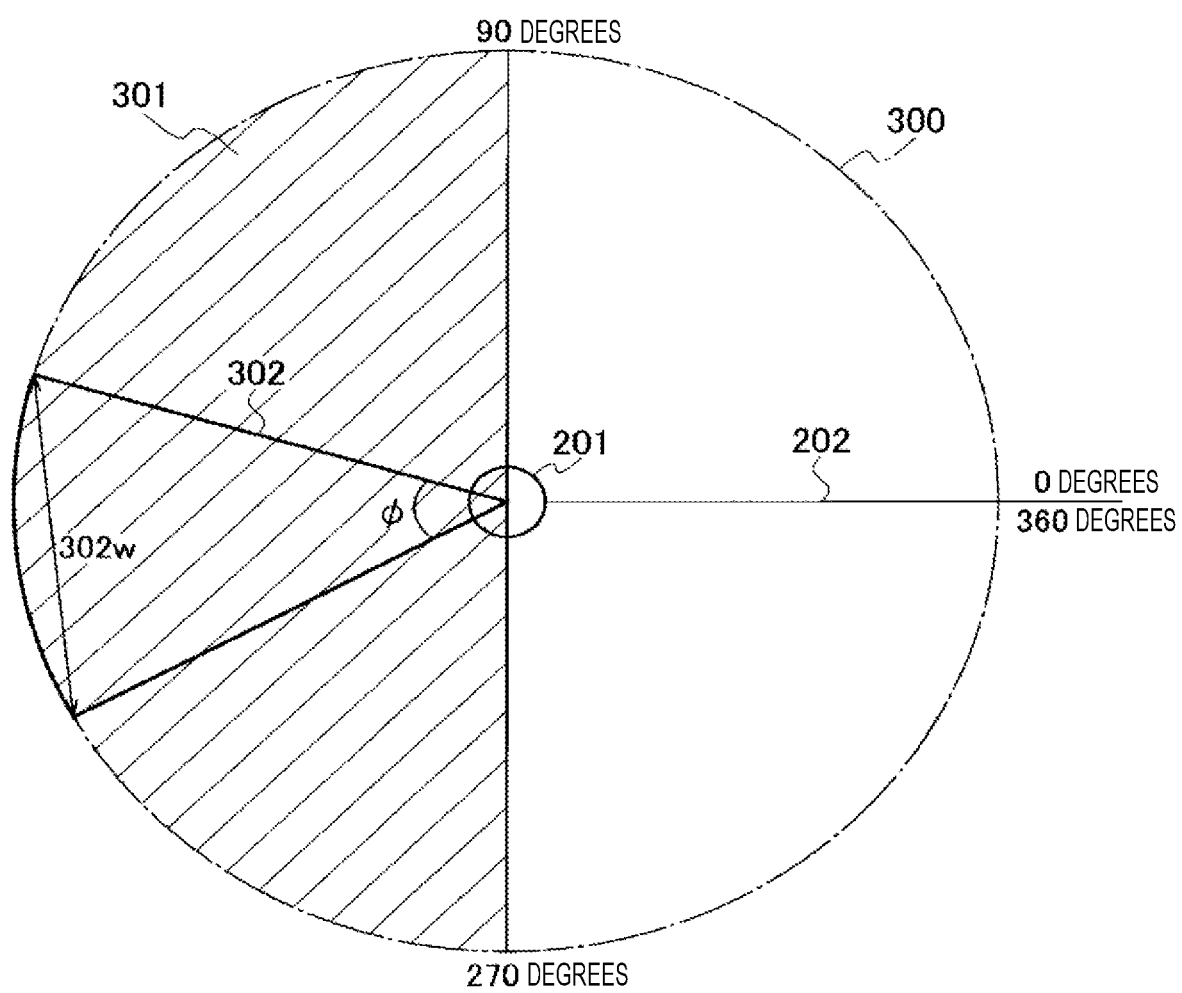
FIG. 16 is a diagram showing a candidate angle region set in the search region.

As shown in FIG. 16, the optimum scattering angle calculator 213 sets an angle region 301 between 90 degrees and 270 degrees in the search region 300, for example, as an angle region to be a candidate of a scattering angle in which molten metal is to be scattered. In the following, the angle region 301 will be referred to as a candidate angle region 301. In order to ensure that the spatters Sp are hardly adhered to the approach path 202 as described above, the candidate angle region 301 is desirably the angle region between 90 degrees and 270 degrees. However, an operator may operate the operation section 1 to set the angles of the candidate angle region 301 to other than between 90 degrees and 270 degrees. The candidate angle region 301 has to be an angle region that does not include the approach path 202.

As described with reference to FIGS. 9, 10A, 11A and 11B, the spread angle φ in which the spatters Sp are to be spread in a fan shape may be set to a predetermined angle. For example, in a case where the nozzle diameter is 2 mm and the amount of displacement is 250 mm or more, the spread angle φ may be made smaller than 45 degrees. Specifically what angle is to be adopted as the spread angle φ can be determined in advance by an experiment.

As shown in FIG. 16, an angle region having the spread angle φ is taken as a scattering angle region 302 where molten metal is to be scattered. A length 302w of a chord connecting both ends of a circular arc of the scattering angle region 302 is taken as a width of the scattering angle region 302. Here, a center angle of the scattering angle region 302 is the spread angle φ, but an angle that is wider than the spread angle φ may alternatively be made the center angle of the scattering angle region 302 by taking the direction angle difference Δφ into account. It suffices if the center angle of the scattering angle region 302 is set based on the spread angle φ.

In the case where the processing path for another product is included in the candidate angle region 301, the scattering angle region 302 has to be set to have an angle that does not include the processing path for the other product. The spread angle φ that is set in advance or the spread angle φ that is input by the operator through the operation section 1 is input to the optimum scattering angle calculator 213. Additionally, the length 302w of the chord may be input instead of the spread angle φ.

Figure 17:
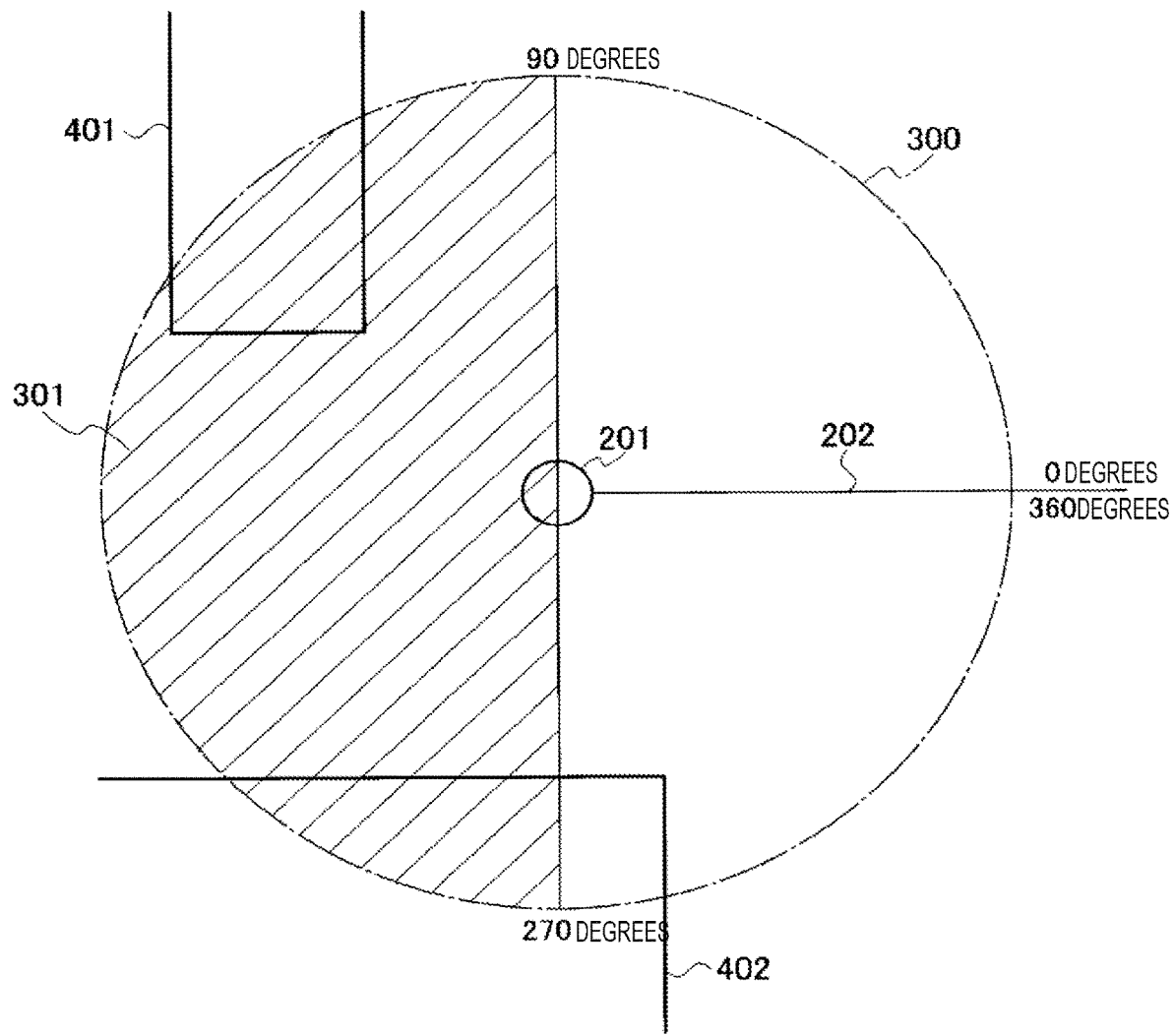
FIG. 17 is a diagram showing an example of processing paths for another product present in the candidate angle region.

It is assumed, as shown in FIG. 17, that processing paths 401 and 402 for another product are included in the candidate angle region 301. When the product 200 is taken as a first product, the other product is a second product. The processing paths 401 and 402 may be processing paths for one second product or may be processing paths for different second products.

According to the blank layout data shown in FIG. 14, the processing paths 401 and 402 are not included in the search region 300 (the candidate angle region 301). To describe the manner of calculation of the optimum scattering angle in a case where there is a processing path for another product in the candidate angle region 301, a case is given as an example where the processing paths 401 and 402 for another product are included in the candidate angle region 301. The number of processing paths for another product included in the candidate angle region 301 is one or more.

The optimum scattering angle calculator 213 rotates the fan-shaped scattering angle region 302 (see FIG. 16) around the center of the pierced hole 201, and extracts an angle region that does not interfere with any of the approach path 202 and the processing paths 401 and 402.

Figure 18:
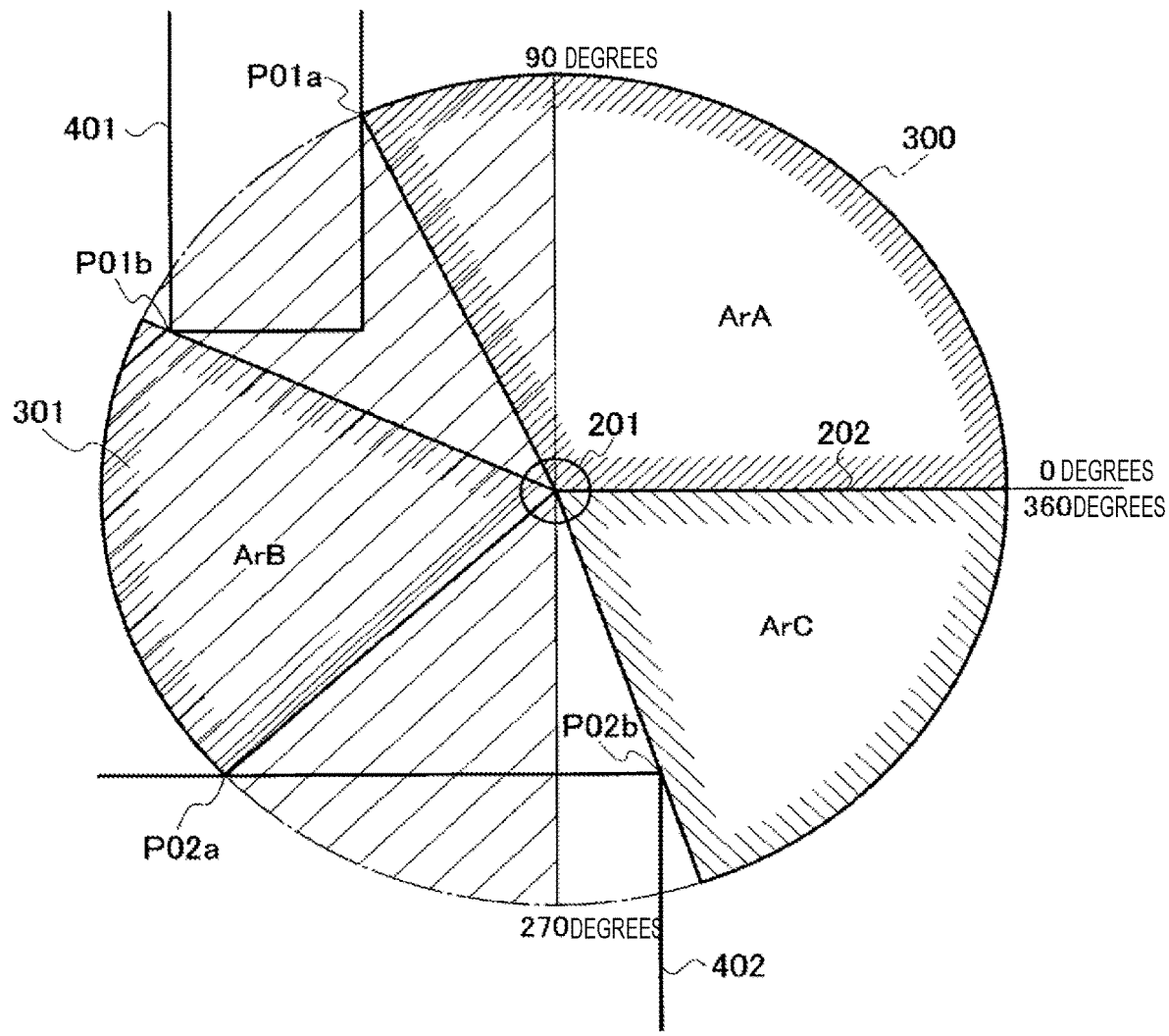
FIG. 18 is a diagram showing a state where a plurality of angle regions are extracted from the search region, the angle regions each being a region in which, when a fan-shaped scattering angle region in which molten metal is to be scattered is rotated around the center of the pierced hole, the scattering angle region does not interfere with any of an approach path and the processing paths for the other product.

As shown in FIG. 18, the optimum scattering angle calculator 213 extracts, from the search region 300, fan-shaped angle regions ArA, ArB and ArC. The angle regions ArA, ArB and ArC are each an angle region at least having an angle range of the scattering angle region 302. In this case, three angle regions are extracted, but one or more angle regions may be extracted.

When the scattering angle region 302 is rotated counterclockwise, the angle region ArA is an angle region from an angle greater than 0 degrees at which the scattering angle region 302 does not contact the approach path 202 to an angle just short of contact with a point P01a on the processing path 401. The angle region ArB is an angle region from an angle at which the scattering angle region 302 does not contact a point P01b on the processing path 401 to an angle just short of contact with a point P02a on the processing path 402. The angle region ArC is an angle region from an angle at which the scattering angle region 302 does not contact a point P02b on the processing path 402 to an angle less than 360 degrees at which the scattering angle region 302 does not contact the approach path 202.

Figure 19:
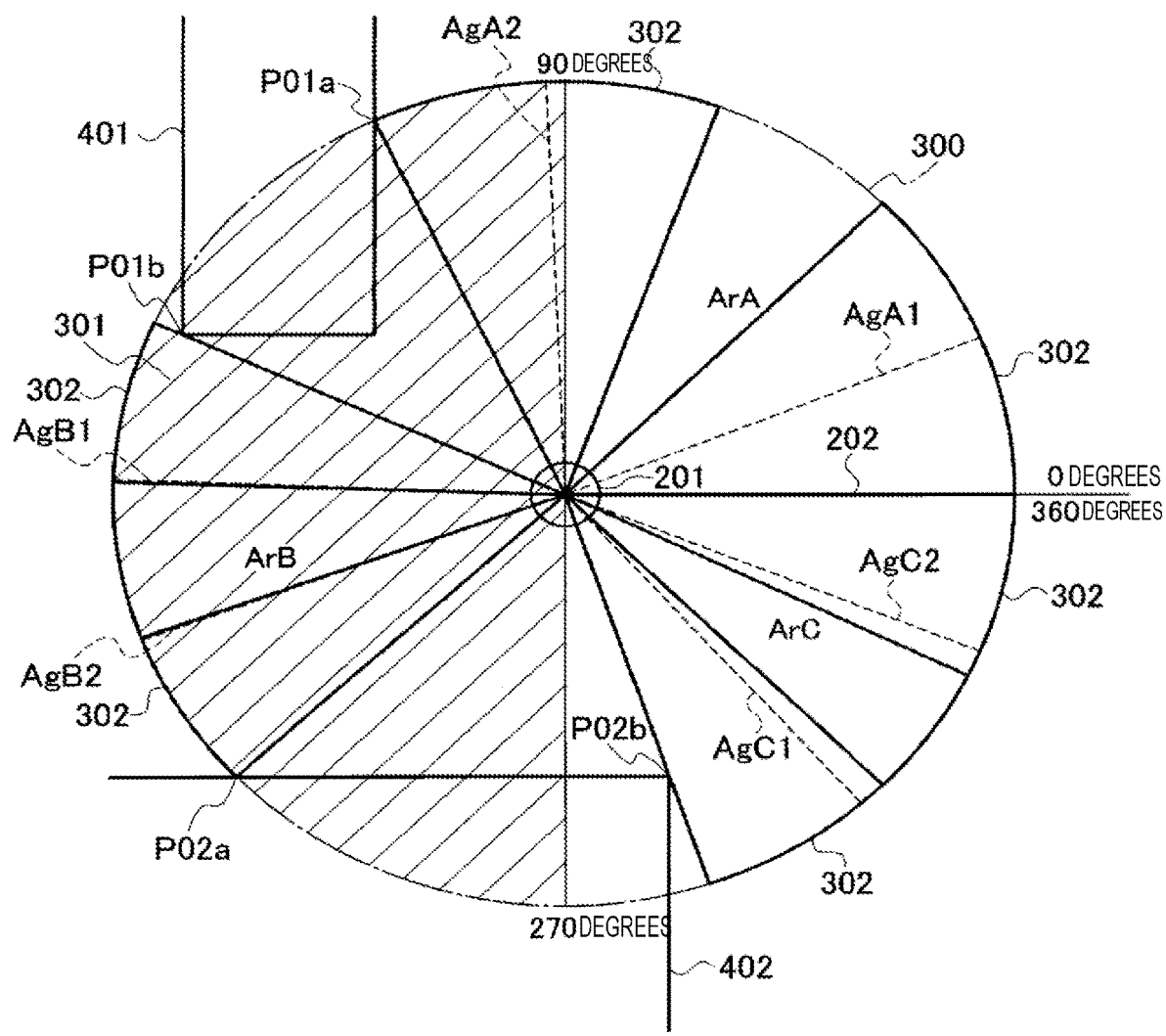
FIG. 19 is a diagram showing a process of determining angles at which bisectors of the plurality of angle regions are located.

As shown in FIG. 19, the optimum scattering angle calculator 213 arranges the scattering angle region 302 at both end portions, in an angle direction, within the angle regions ArA, ArB and ArC. The optimum scattering angle calculator 213 determines angles AgA1 and AgA2 where bisectors of two scattering angle regions 302 arranged in the angle region ArA are located. The optimum scattering angle calculator 213 determines angles AgB1 and AgB2 where bisectors of two scattering angle regions 302 arranged in the angle region ArB are located. The optimum scattering angle calculator 213 determines angles AgC1 and AgC2 where bisectors of two scattering angle regions 302 arranged in the angle region ArC are located.

Figure 20:
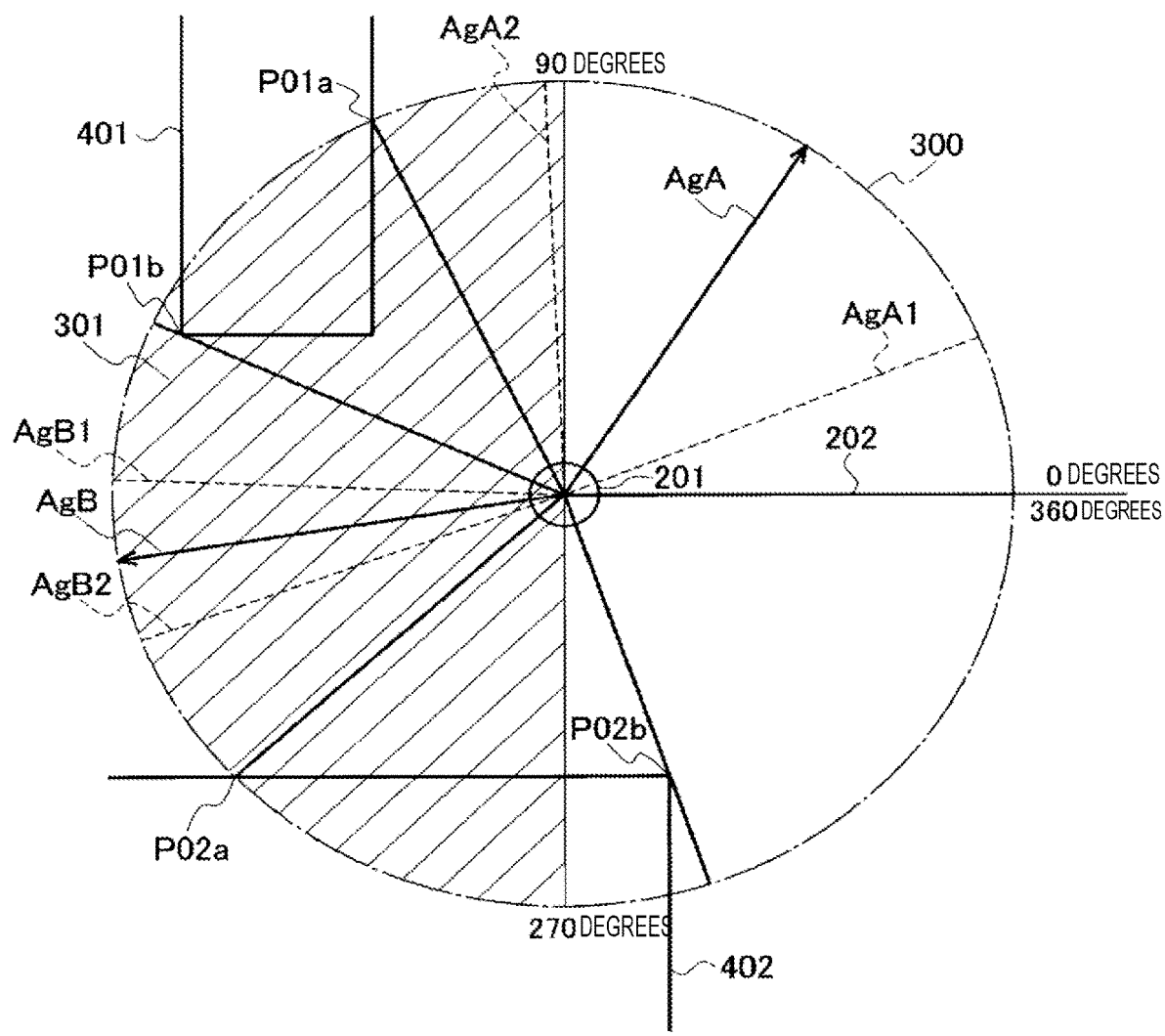
FIG. 20 is a diagram showing a state where the angles at which the bisectors of the plurality of angle regions are located are determined.

As shown in FIG. 20, the optimum scattering angle calculator 213 determines an angle AgA where a bisector of a fan-shaped region between the angles AgA1 and AgA2 is located, and determines an angle AgB where a bisector of a fan-shaped region between the angles AgB1 and AgB2 is located. Neither of the angles AgC1 and AgC2 shown in FIG. 19 is included in the candidate angle region 301, and thus, the optimum scattering angle calculator 213 does not determine an angle where a bisector of a fan-shaped region between the angles AgC1 and AgC2 is located, and the angle region ArC is excluded from targets for which the angle where a bisector is located is to be determined. The angles AgA and AgB are angles where the bisectors of the fan-shaped angle regions ArA and ArB are located. In the following, the angles AgA and AgB will be referred to as bisecting angles AgA and AgB.

Figure 21:
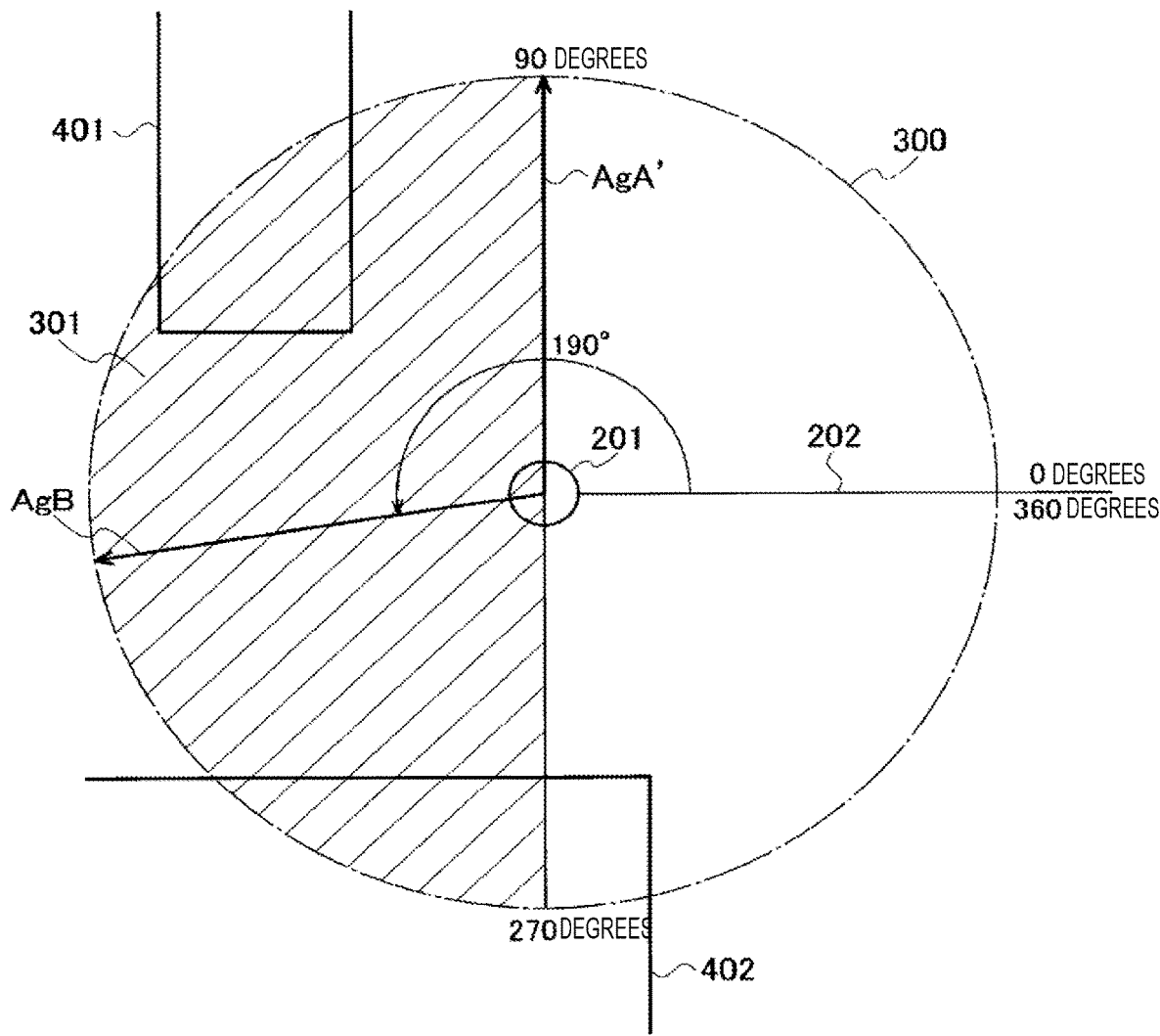
FIG. 21 is a diagram showing a state where an angle at which one bisector is located is finally selected, and where the selected angle is determined to be an optimum scattering angle.

When the bisecting angle AgA or AgB is less than 90 degrees, the optimum scattering angle calculator 213 corrects the same to 90 degrees; when the bisecting angle AgA or AgB is between 90 degrees and 270 degrees and is within the candidate angle region 301, the optimum scattering angle calculator 213 does not perform correction; when the bisecting angle AgA or AgB is more than 270 degrees, the optimum scattering angle calculator 213 corrects the same to 270 degrees. In FIG. 21, AgA' is a corrected bisecting angle that is the bisecting angle AgA shown in FIG. 20 after being corrected to 90 degrees. The bisecting angle AgB is not corrected.

Lastly, the optimum scattering angle calculator 213 determines, as the optimum scattering angle, from the corrected bisecting angle AgA' and the bisecting angle AgB, an angle closest to an extended line obtained by extending the approach path 202 in a direction away from the product 200 (that is, an angle closest to 180 degrees). In FIG. 21, the bisecting angle AgB is determined to be the optimum scattering angle. Here, the optimum scattering angle is assumed to be 190 degrees. The optimum scattering angle indicates the direction angle at which the laser beam positioned at the center of the opening 36a of the nozzle 36 is to be displaced.

Additionally, in the case where none of the angles of the bisectors of the two scattering angle regions 302 set in each angle region in the search region 300 are within the candidate angle region 301, the process for calculating the optimum scattering angle is ended. In the case where 90 degrees and 270 degrees are determined as the bisecting angle(s) or the corrected bisecting angle(s) of two angle regions set in the search region 300, the optimum scattering angle calculator 213 may take either 90 degrees or 270 degrees as the optimum scattering angle. In the case where one of 90 degrees and 270 degrees is a bisecting angle that is not corrected and the other is a corrected bisecting angle, the bisecting angle that is not corrected may be taken as the optimum scattering angle.

The method for extracting the angle regions ArA, ArB and ArC from the search region 300, and the method for determining the respective bisecting angles AgA and AgB of the angle regions ArA and ArB are not limited to the methods described above. The optimum scattering angle calculator 213 may extract an angle region that does not interfere with any of the approach path 202 and the processing paths 401 and 402 by rotating a straight line that is the radius r around the center of the pierced hole 201. The optimum scattering angle calculator 213 may take an angle where the bisector of the extracted angle region is located as the bisecting angle.

Additionally, in this case, if the angle of an extracted angle region is smaller than the spread angle φ that is the angle of the scattering angle region 302, such an angle region should be excluded from target angle regions for which the bisecting angle is to be determined.

In the case where a processing path for another product, such as the processing path 401 or 402, is not included in the candidate angle region 301, the optimum scattering angle is calculated to be 180 degrees. Accordingly, the laser beam positioned at the center of the opening 36a is displaced to be on the extended line obtained by extending the approach path 202 in a direction away from the product 200.

Figure 22:
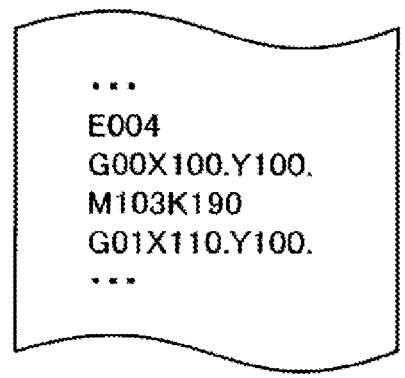
FIG. 22 is a partial schematic view of a processing program in which an auxiliary code indicating the optimum scattering angle is added.

FIG. 22 shows, in a simplified manner, an example of the processing program that is created by the program creator 214 and that includes a G code. M103 is a code indicating start of cutting, and a code starting with G, immediately before the code M103, indicates the position of the pierced hole. For example, the program creator 214 adds the auxiliary code indicating the optimum scattering angle after the code M103. In the example described above, the optimum scattering angle is 190 degrees, and thus, an auxiliary code "K190" is added to the code M103.

In the example shown in FIG. 22, a processing condition indicated by an E number E4 indicated by E004 is set. The processing condition may be automatically selected according to the material of the sheet metal W, or may be selected by the operator through the operation section 1.

The process of calculating of the optimum scattering angle and creating the processing program by the computer appliance 2 will be described again with reference to the flowchart shown in FIG. 23. When the process is started, the computer appliance 2 populates the part data in step S1, and creates a layout of the processing path for a part in step S2. In step S3, the computer appliance 2 creates a blank layout of the part. In step S4, the computer appliance 2 searches for the position of a pierced hole for cutting an outer shape (an outer circumference) of the part, and the position of a pierced hole for forming a hole in the part.

In step S5, the computer appliance 2 determines whether the position of a pierced hole is extracted as a result of the search. In the case where the position of a pierced hole is not extracted (NO), the computer appliance 2 repeats the processes in steps S4 and S5 or in steps S4 to S6. In the case where the position of a pierced hole is extracted in step S5 (YES), the computer appliance 2 acquires, in step S7, the direction of an approach path to be connected to the pierced hole.

In step S8, the computer appliance 2 calculates the optimum scattering angle. In step S9, the computer appliance 2 determines whether the optimum scattering angle is successfully calculated. In the case where the optimum scattering angle is not successfully calculated (NO), the computer appliance 2 proceeds with the process to step S6. In the case where the optimum scattering angle is successfully calculated (YES), the computer appliance 2 adds, in step S10, the auxiliary code indicating the angle direction to which the laser beam is to be displaced to the code (M103) indicating start of cutting, and proceeds with the process to step S6. The processes from steps S7 to S10 are performed for all the pierced holes.

In step S6, the computer appliance 2 determines whether positions of all the pierced holes are already retrieved. In the case where positions of all the pierced holes are not yet retrieved (NO), the computer appliance 2 returns the process to step S4, and in the case where positions of all the pierced holes are already retrieved (YES), the computer appliance 2 ends the process.

Figure 23:
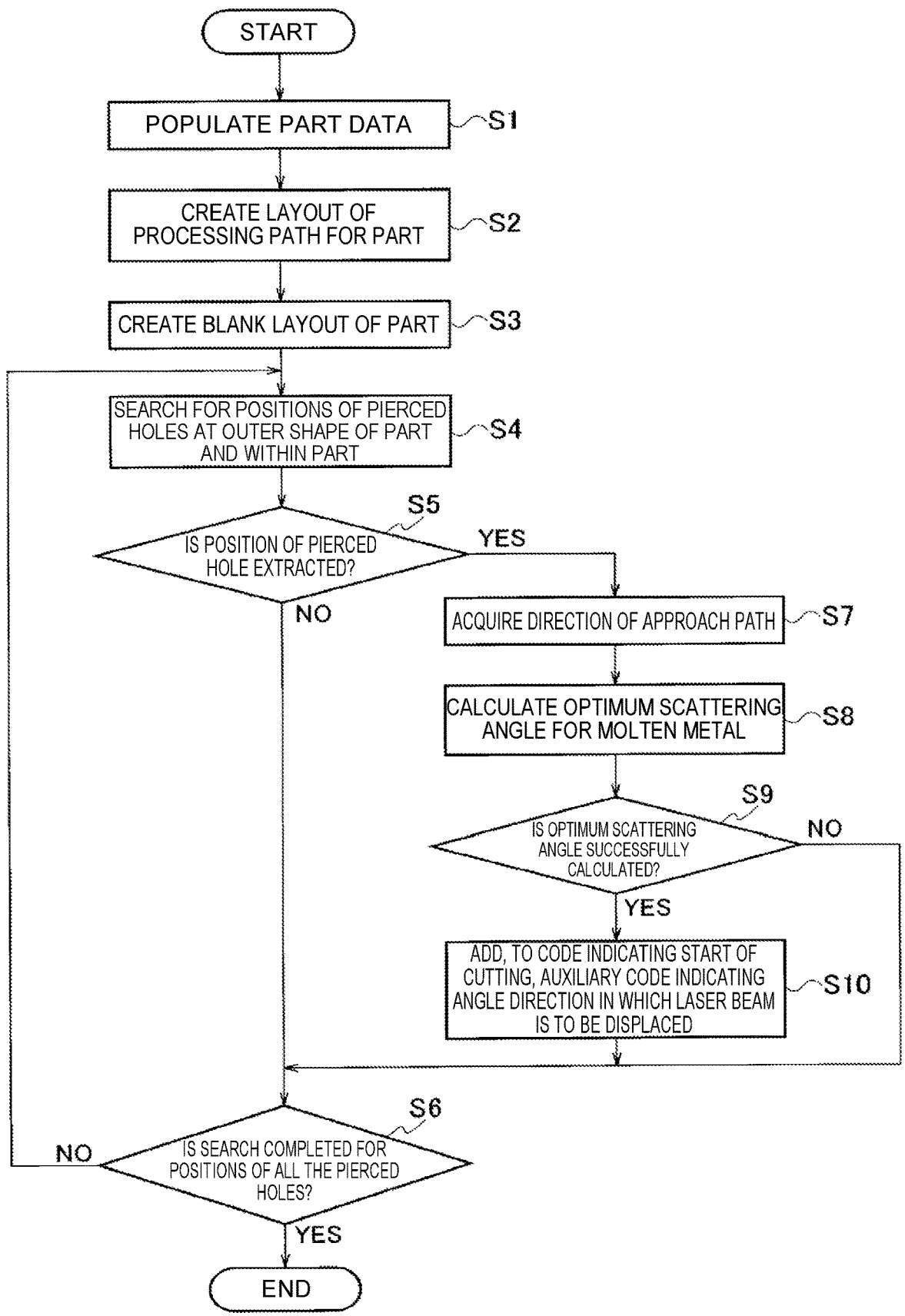
FIG. 23 is a flowchart showing a process of creating the processing program in which the auxiliary code indicating the optimum scattering angle is added.

FIG. 23 shows an example where the auxiliary code is added at a time of newly creating a processing program. The computer appliance 2 may read out a processing program that is already created and stored in the processing program database 60, analyze the processing program, and store the processing program in the processing program database 60 after adding the auxiliary code to a code indicating start of cutting. In this case, the processing program that is stored in advance in the processing program database 60 may be updated by the processing program where the auxiliary code is added.

Referring back to FIG. 1, the NC device 50 reads out the processing program in which the auxiliary code is written from the processing program database 60, and reads out the processing condition set by the processing program from the processing condition database 70. The NC device 50 controls the laser processing machine 100 such that the sheet metal W is processed according to the processing program and the processing condition that are read out.

At the time of opening the pierced hole 201 in the sheet metal W, if the auxiliary code is written, the NC device 50 reads the auxiliary code, and controls the galvano scanner unit 32 such that the laser beam is displaced, within the opening 36a of the nozzle 36, in the angle direction indicated by the auxiliary code.

The distance by which the laser beam is to be displaced by the galvano scanner unit 32 in the angle direction indicated by the auxiliary code is set in the processing condition indicated by the E number. That is, the distance by which the laser beam is to be displaced at the time of opening of the pierced hole 201 is set in various processing conditions stored in the processing condition database 70. In the case where the auxiliary code is added at a time of opening the pierced hole 201 in the sheet metal W, the NC device 50 displaces the laser beam by the distance that is set in the processing condition.

Figure 24A:
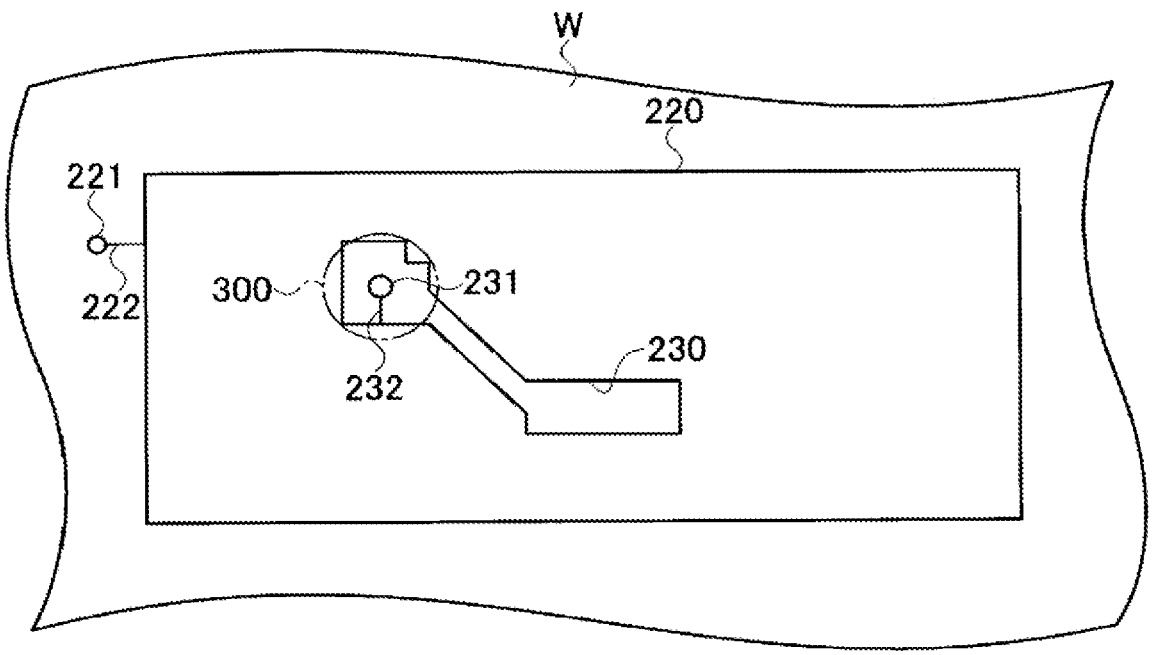
FIG. 24A is a diagram showing an example of a product in which a small opening is to be formed.

A product 220 shown in FIG. 24A is an example of a product in which an opening 230 is to be formed. To fabricate the product 220 by cutting the sheet metal W, the laser processing machine 100 first opens a pierced hole 231 and cuts an approach path 232, and then cuts the sheet metal W to form the opening 230. Next, the laser processing machine 100 opens a pierced hole 221 and cuts an approach path 222, and cuts along an outer circumference of the product 220. In the example shown in FIG. 24A, the opening 230 is small, and thus, if the search region 300 that is a circle having the radius r and centered on a center of the pierced hole 231 is set and the scattering angle region 302 is arranged in the manner shown in FIG. 16, a processing path for the opening 230 is interfered with regardless of the angle direction. Accordingly, the computer appliance 2 is not able to calculate the optimum scattering angle.

Figure 24B:
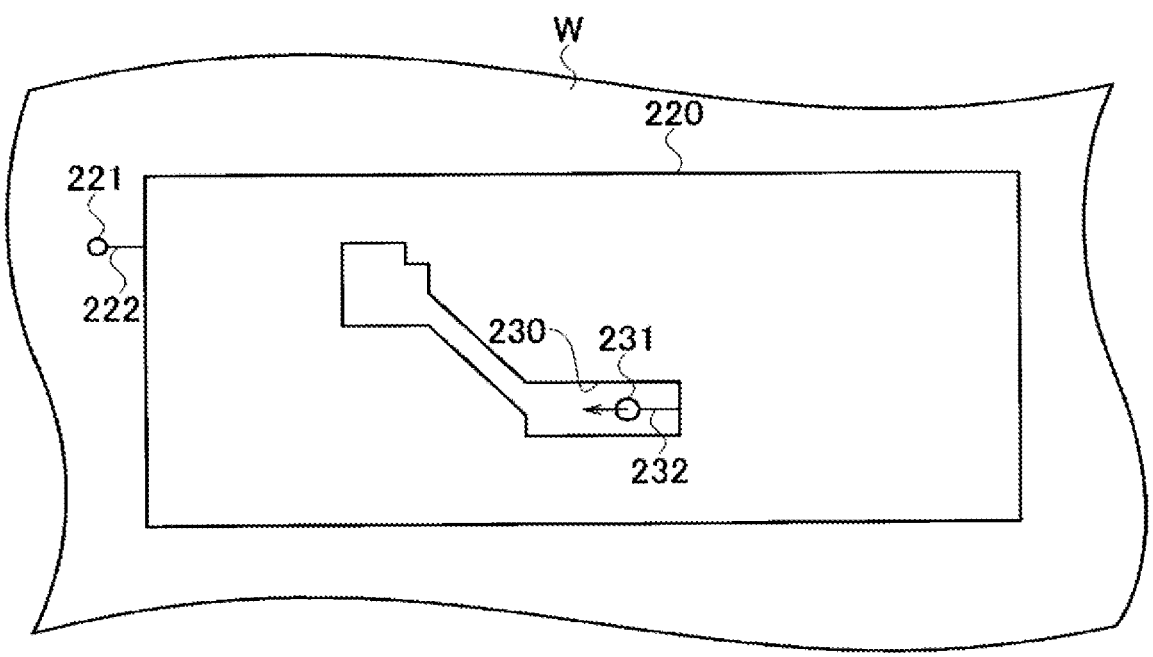
FIG. 24B is a diagram showing a state where positions of a pierced hole and an approach path for forming the opening in the product shown in FIG. 24A are changed.

In such a case, the computer appliance 2 may calculate the optimum scattering angle by changing positions of the pierced hole 231 and the approach path 232 in the manner shown in FIG. 24B. In FIG. 24B, the computer appliance 2 may calculate an angle of a direction indicated by an arrow as the optimum scattering angle.

Instead of changing the positions of the pierced hole and the approach path, the laser processing machine 100 may increase or decrease a length of the approach path or change an angle of the approach path without changing the positions of the pierced hole and the approach path.

The optimum scattering angle may be calculated in the following manner instead of being calculated by rotation of the scattering angle region 302 within the search region 300 as described with reference to FIGS. 15 to 21. In the example shown in FIG. 25, a blank layout is created on the sheet metal W for rectangular products 241 to 244 having different sizes. A pierced hole 251 and an approach path 252 are provided for the product 241. A case of calculating the optimum scattering angle at the time of opening the pierced hole 251 will be described as an example.

Figure 25:
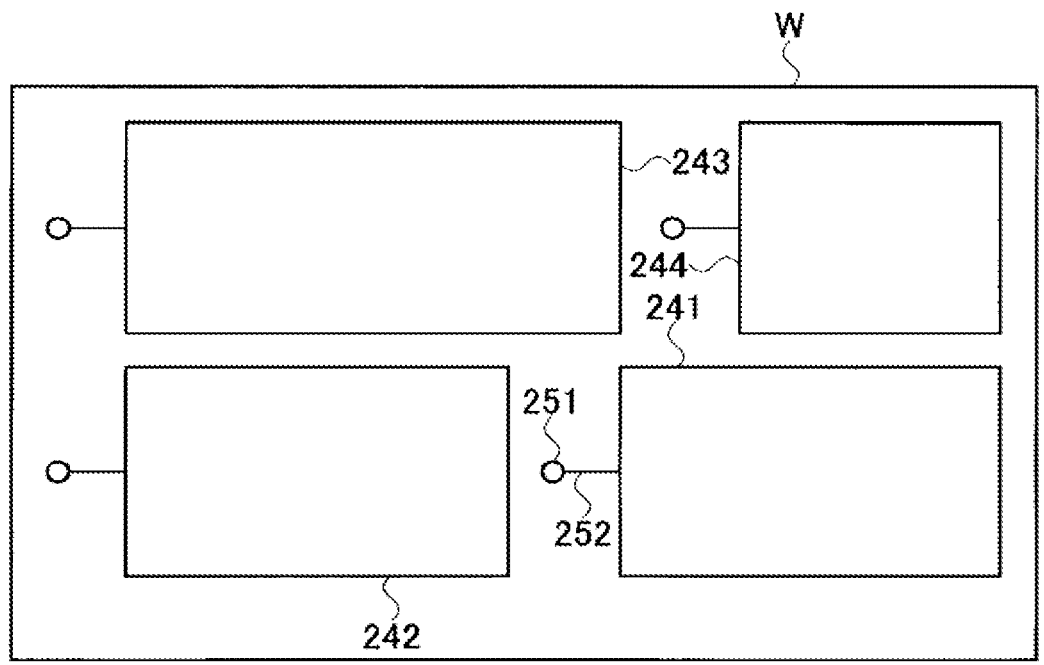
FIG. 25 is a plan view showing a state where a blank layout of a plurality of rectangular products having different sizes is created on a sheet metal.
Figure 26:
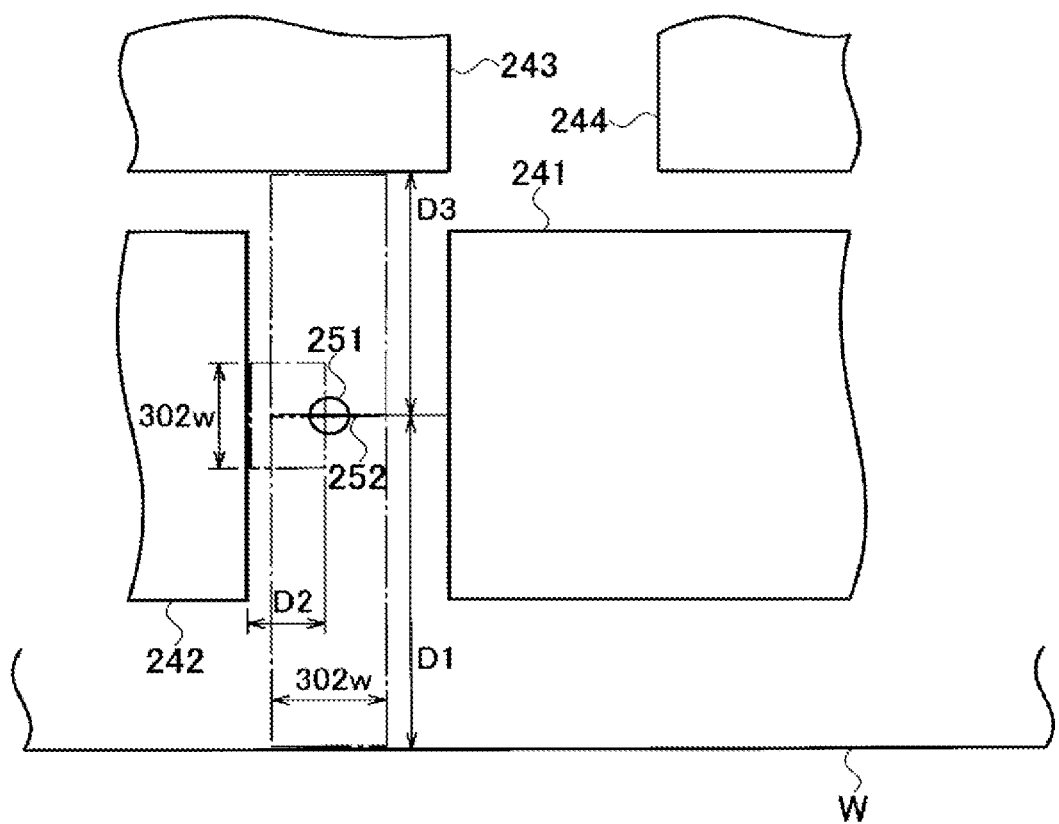
FIG. 26 is a partial enlarged view of FIG. 25, for describing another calculation method for the optimum scattering angle.

FIG. 26 is an enlarged view showing a periphery of the pierced hole 251 in FIG. 25. The computer appliance 2 forms a rectangle having the width 302w of the scattering angle region 302, positions an edge portion of the rectangle at a center of the pierced hole 251, and rotates the rectangle to each predetermined angle in the circumferential direction around the center of the pierced hole 251. At this time, the computer appliance 2 extends the rectangle at each angle until the rectangle interferes with one of processing paths (including the pierced holes and the approach paths) for the products 242 to 244 other than the product 241.

FIG. 26 shows the rectangle that is extended in three directions. A length of the rectangle that is orthogonal to the approach path 252 and that is extended in a direction away from the product 243 is given as D1. A length of the rectangle that is extended in an extension direction of the approach path 252 is given as D2. A length of the rectangle that is orthogonal to the approach path 252 and that is extended in a direction of the product 243 is given as D3. When comparing the lengths D1 to D3, the length D1 is the longest, and the length D1 is the longest at every angle in the circumferential direction around the center of the pierced hole 251. Accordingly, the computer appliance 2 calculates, as the optimum scattering angle, an angle (270 degrees) of the direction orthogonal to the approach path 252 and away from the product 243.

The present invention is not limited to the one or more embodiments described above, and various modifications may be made without departing from the scope of the gist of the present invention.

The invention claimed is:

1. A processing program creation device comprising:
an optimum scattering angle calculator configured to calculate an optimum scattering angle that is an angle most desirable for scattering of molten metal in a search region at a time of piercing processing of opening a pierced hole in a sheet metal to cut the sheet metal and fabricate a first product, the molten metal being generated by melting of the sheet metal, the search region being a circle having a predetermined radius and centered on a center of the pierced hole, the molten metal being not adhered to an approach path extending to the pierced hole and not adhered to a processing path for a second product positioned within the search region at the optimum scattering angle; and
a program creator configured to create a processing program by adding an auxiliary code to a code for cutting the sheet metal and fabricating the first product, the auxiliary code indicating that, at a time of the piercing processing on the first product, a position of a laser beam in an opening of a nozzle attached to a tip end of a processing head is displaced in an angle direction of the optimum scattering angle from a center of the opening, the laser beam being emitted from the opening, wherein
the optimum scattering angle calculator is configured to:
set the search region;
set a scattering angle region having a center angle based on a spread angle of spatters determined in advance, the scattering angle region being where the molten metal is scattered and spread in a fan shape to be adhered to the sheet metal when a position of the laser beam in the opening is displaced from the center of the opening while assist gas is being blown onto the sheet metal from the opening, the laser beam being emitted from the opening;
extract, from the search region, two or more angle regions at least having an angle range of the scattering angle region, the two or more angle regions not interfering with both the approach path and the processing path;
determine a bisecting angle that is an angle at which a bisector of each angle region of the two or more angle regions is located; and
determine, as the optimum scattering angle indicating an angle direction in which the molten metal is to be scattered, an angle, among the bisecting angles of the two or more angle regions, closest to an extension line obtained by extending the approach path in a direction away from the first product.

2. The processing program creation device according to claim 1, wherein the program creator is configured to add the auxiliary code to a code indicating opening of the pierced hole in the sheet metal and indicating start of cutting of the sheet metal.

3. The processing program creation device according to claim 1, wherein
the optimum scattering angle calculator is configured:
to set a candidate angle region in the search region, the candidate angle region having a predetermined angle range not including the approach path; and
to exclude, from a target angle region for which the bisecting angle is to be determined, an angle region having the angle range of the scattering angle region and positioned outside the candidate angle region.

4. A processing program creation method comprising:
using a computer appliance to calculate an optimum scattering angle that is an angle most desirable for scattering of molten metal in a search region at a time of piercing processing of opening a pierced hole in a sheet metal to cut the sheet metal and fabricate a first product, the molten metal being generated by melting of the sheet metal, the search region being a circle having a predetermined radius and centered on a center of the pierced hole, the molten metal being not adhered to an approach path extending to the pierced hole and not adhered to a processing path for a second product positioned within the search region at the optimum scattering angle; and
using the computer appliance to create a processing program by adding an auxiliary code to a code for cutting the sheet metal and fabricating the first product, the auxiliary code indicating that, at a time of the piercing processing on the first product, a position of a laser beam in an opening of a nozzle attached to a tip end of a processing head is displaced in an angle direction of the optimum scattering angle from a center of the opening, the laser beam being emitted from the opening, wherein
using the computer appliance to calculate the optimum scattering angle comprises:
setting the search region;
setting a scattering angle region having a center angle based on a spread angle of spatters determined in advance, the scattering angle region being where the molten metal is scattered and spread in a fan shape to be adhered to the sheet metal when a position of the laser beam in the opening is displaced from the center of the opening while assist gas is being blown onto the sheet metal from the opening, the laser beam being emitted from the opening;
extracting, from the search region, two or more angle regions at least having an angle range of the scattering angle region, the two or more angle regions not interfering with both the approach path and the processing path;
determining a bisecting angle that is an angle at which a bisector of each angle region of the two or more angle regions is located; and
determining, as the optimum scattering angle indicating an angle direction in which the molten metal is to be scattered, an angle, among the bisecting angles of the two or more angle regions, closest to an extension line obtained by extending the approach path in a direction away from the first product.

5. The processing program creation method according to claim 4, wherein using the computer appliance to create the processing program comprises adding the auxiliary code to a code indicating opening of the pierced hole in the sheet metal and indicating start of cutting of the sheet metal.

\* \* \* \* \*